US012535760B2

(12) United States Patent
Oonuma et al.

(10) Patent No.: US 12,535,760 B2
(45) Date of Patent: Jan. 27, 2026

(54) SHEET DETECTION DEVICE AND IMAGE FORMING APPARATUS

(71) Applicant: CANON KABUSHIKI KAISHA, Tokyo (JP)

(72) Inventors: Takahiro Oonuma, Chiba (JP); Katsuhide Koga, Ibaraki (JP); Hiroki Sato, Ibaraki (JP); Norio Negishi, Tokyo (JP); Kazusa Morimoto, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/829,618

(22) Filed: Sep. 10, 2024

(65) Prior Publication Data

US 2025/0093803 A1 Mar. 20, 2025

(30) Foreign Application Priority Data

Sep. 14, 2023 (JP) ................................ 2023-149048

(51) Int. Cl.
*G03G 15/00* (2006.01)

(52) U.S. Cl.
CPC ..... *G03G 15/5029* (2013.01); *G03G 15/6529* (2013.01); *G03G 2215/00616* (2013.01); *G03G 2215/00637* (2013.01)

(58) Field of Classification Search
CPC ........... G03G 15/5029; G03G 15/6529; G03G 15/6558; G03G 15/6567; G03G 15/6588–6594; G03G 2215/00561; G03G 2215/00565; G03G 2215/00611; G03G 2215/00616; G03G 2215/0062; G03G 2215/00637; G03G 2215/00675;
(Continued)

(56) References Cited

U.S. PATENT DOCUMENTS

2003/0194252 A1* 10/2003 Nakamori .......... G03G 15/5029
399/389
2004/0094458 A1* 5/2004 Akaike .................. G01N 33/34
209/599

(Continued)

FOREIGN PATENT DOCUMENTS

JP 2006117374 A 5/2006
JP 2008094600 A 4/2008
JP 2018200478 A 12/2018

*Primary Examiner* — Carla J Therrien
(74) *Attorney, Agent, or Firm* — ROSSI, KIMMS & McDOWELL LLP

(57) ABSTRACT

A sheet detection device includes a measurement unit for measuring a feature amount of a sheet conveyed by a conveyance unit, a pressing member movable between a first position separated from the measurement unit and a second position closer to the measurement unit than the first position, and a moving unit configured to move the pressing member, wherein the pressing member is arranged by the moving unit at the first position in a case where the measurement unit detects that the sheet has not been conveyed to a measurement position of the measurement unit, wherein the moving unit is configured to move the pressing member from the first position to the second position in a case where the measurement unit detects that the sheet has been conveyed to the measurement position of the measurement unit.

12 Claims, 15 Drawing Sheets

(58) Field of Classification Search
CPC .......... G03G 2215/00679; G03G 2215/00683; G03G 2215/00717; G03G 2215/00738; G03G 2215/00742; G03G 2215/00751; G03G 2215/00763; G03G 2215/00767; G03G 2215/00784; B65H 5/36; B65H 2404/153; B65H 2404/1544; B65H 2553/83
See application file for complete search history.

(56) References Cited

U.S. PATENT DOCUMENTS

| | | | | |
|---|---|---|---|---|
| 2006/0022400 | A1* | 2/2006 | Kawasaki | B41J 11/009 271/227 |
| 2014/0161475 | A1* | 6/2014 | Matsui | G03G 15/5029 399/45 |
| 2016/0114994 | A1* | 4/2016 | Fukusaka | B65H 7/02 271/227 |
| 2020/0255239 | A1* | 8/2020 | Izumiya | B65H 7/02 |
| 2020/0356037 | A1* | 11/2020 | Yoshimura | G03G 15/5029 |
| 2022/0176715 | A1* | 6/2022 | Yoshimura | B41J 11/009 |
| 2024/0036503 | A1 | 2/2024 | Koyanagi et al. | |
| 2024/0126199 | A1* | 4/2024 | Sato | G03G 15/5004 |
| 2025/0033913 | A1* | 1/2025 | Matsui | G03G 15/5029 |
| 2025/0093804 | A1* | 3/2025 | Morimoto | G03G 15/6558 |

* cited by examiner

SHEET DETECTION DEVICE AND IMAGE FORMING APPARATUS

BACKGROUND OF THE INVENTION

Field of the Invention

The present disclosure relates to a sheet detection device which includes a media sensor for discriminating a type of a sheet, and an image forming apparatus including such a sheet detection device.

Description of the Related Art

In recent years, image forming apparatus include a media sensor for discriminating a type of a sheet, which is a recording medium. The media sensor measures feature amounts of the sheet by using, for example, an optical sensor or an ultrasonic wave sensor. The image forming apparatus extracts, based on measurement results of the feature amounts of the sheet obtained by the media sensor, relevant sheet information from sheet information registered in advance and discriminates the type of the sheet. The sheet information is information including the feature amounts (for example, basis weight and surface properties) for each type of sheet.

The media sensor measures the feature amounts from the sheet which is being conveyed. In this case, the distance between the media sensor and the sheet may vary due to positional fluctuation (flapping) of the sheet at the measurement position of the media sensor. The flapping of the sheet may reduce the detection accuracy of the feature amounts by the media sensor. Particularly in a case where the media sensor is an optical sensor, the sheet may shift from the focus of the optical sensor, reducing the accuracy of the measurement results. This may lead to a reduction in the discrimination accuracy of the sheet type.

Meanwhile, in Japanese Patent Application Laid-open No. 2018-200478, there is disclosed a configuration in which a roller serving as a pressing member is arranged at a position facing the media sensor across a conveyance path of the sheet. In such a configuration, flapping of the sheet is suppressed by the roller pressing the sheet onto a surface of the media sensor.

However, although the pressing member which presses the sheet onto the media sensor suppresses the reduction in sheet detection accuracy, the pressing of the sheet may cause a sheet conveyance failure such as a paper jam. The present disclosure has been made in view of the problems described above, and a main object of the present disclosure is to provide a sheet detection device which can suppress a reduction in sheet detection accuracy and also suppress occurrence of a sheet conveyance failure.

SUMMARY OF THE INVENTION

A sheet detection device according to one embodiment of the present disclosure includes a measurement unit for measuring a feature amount of a sheet conveyed by a conveyance unit, a pressing member movable between a first position separated from the measurement unit and a second position closer to the measurement unit than the first position, and a moving unit configured to move the pressing member, wherein the pressing member is arranged by the moving unit at the first position in a case where the measurement unit detects that the sheet has not been conveyed to a measurement position of the measurement unit, wherein the moving unit is configured to move the pressing member from the first position to the second position in a case where the measurement unit detects that the sheet has been conveyed to the measurement position of the measurement unit, and wherein the measurement unit is configured to measure the feature amount of the sheet under a state in which the pressing member is arranged at the second position.

An image forming apparatus according to another embodiment of the present disclosure includes a sheet detection device, and an image forming unit configured to form an image on a sheet by using an image forming condition based on a feature amount of the sheet measured by a measurement unit, wherein the sheet detection device includes, a measurement unit for measuring a feature amount of a sheet conveyed by a conveyance unit, a pressing member movable between a first position separated from the measurement unit and a second position closer to the measurement unit than the first position, and a moving unit configured to move the pressing member, wherein the pressing member is arranged by the moving unit at the first position in a case where the measurement unit detects that the sheet has not been conveyed to a measurement position of the measurement unit, wherein the moving unit is configured to move the pressing member from the first position to the second position in a case where the measurement unit detects that the sheet has been conveyed to the measurement position of the measurement unit, and wherein the measurement unit is configured to measure the feature amount of the sheet under a state in which the pressing member is arranged at the second position.

Further features of the present invention will become apparent from the following description of exemplary embodiments (with reference to the attached drawings).

DESCRIPTION OF THE EMBODIMENTS

Now, referring to the accompanying drawings, description is given of at least one exemplary embodiment of the present disclosure. In the following description, "basis weight" is the mass per unit area of a sheet, and is expressed in units of g/m^2.

<Image Forming Apparatus>

Figure 1:
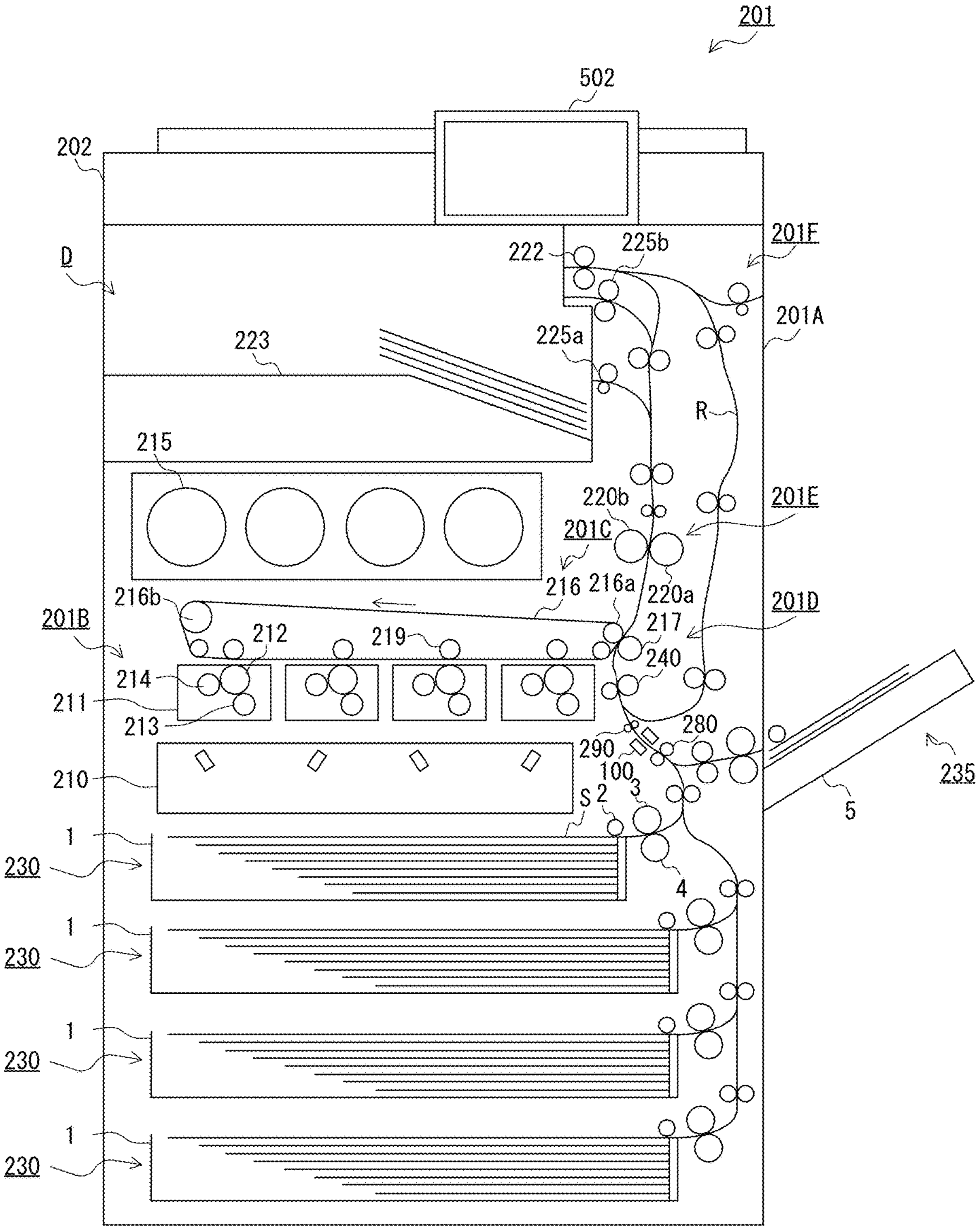
FIG. 1 is a configuration view of an image forming apparatus.

FIG. 1 is a configuration view of an image forming apparatus according to the at least one embodiment. An image forming apparatus 201 according to the at least one embodiment is, for example, a laser beam printer of a tandem intermediate-transfer type using an electrophotographic process. The image forming apparatus 201 forms a full-color image or a monochrome image on a sheet S being a recording medium and outputs the sheet S based on image data acquired from an external device such as a personal computer via a network or based on image data acquired from an image reading device 202 which is provided on the top of the image forming apparatus 201.

The image forming apparatus 201 has, inside a main body 201A, components for forming an image, and includes, on the top of the main body 201A, the image reading device 202 and an operation unit 502. A delivery space D including a placement portion 223 for receiving the sheet S to be delivered thereinto after image formation is defined between the main body 201A of the image forming apparatus 201 and the image reading device 202.

The image reading device 202 is a reader which reads an image from an original to generate image data. The image reading device 202 is used, for example, at the time of processing of copying an original. The image reading device 202 in the at least one embodiment is configured as a part of the image forming apparatus 201. However, the image reading device 202 is not limited to this configuration, and the image reading device 202 may be electrically connected to the image forming apparatus 201 as a device different from the image forming apparatus 201.

The operation unit 502 is a user interface including an input interface and an output interface. Examples of the input interface include various key buttons and a touch panel. Examples of the output interface include a display and a speaker. A user can input various instructions to the image forming apparatus 201 via the operation unit 502. The image forming apparatus 201 notifies the user of various types of information by displaying various screens on the display of the operation unit 502. The operation unit 502 in the at least one embodiment is configured as a part of the image forming apparatus 201. The operation unit 502 is not limited to this configuration, and the operation unit 502 may be electrically connected to the image forming apparatus 201 as a device different from the image forming apparatus 201.

The image forming apparatus 201 includes, in the main body 201A, an image forming unit 201B, an intermediate transfer unit 201C, a secondary transfer unit 201D, a fixing device 201E, and cassette sheet-feeding units 230. The main body 201A includes a manual sheet-feeding unit 235.

The cassette sheet-feeding units 230 each feed sheets S from a corresponding one of sheet-feeding cassettes 1 accommodating the sheets S. The cassette sheet-feeding unit 230 includes a pickup roller 2 and a separation unit. The separation unit includes a feed roller 3 and a retard roller 4 for separating sheets S sent out from the pickup roller 2. The sheets S are fed one by one from the sheet-feeding cassette 1 by the pickup roller 2 and the separation unit. In the at least one embodiment, description is given of a configuration in which a plurality of (in this example, four) cassette sheet-feeding units 230 are provided. However, any number of cassette sheet-feeding units 230 may be provided. The sheet S fed from the cassette sheet-feeding unit 230 is conveyed to a registration roller pair 240 via conveyance roller pairs 280 and 290.

The sheet S can be fed from a unit other than the cassette sheet-feeding unit 230, that is, from the manual sheet-feeding unit 235. The manual sheet-feeding unit 235 includes a manual feeding tray 5 for receiving sheets S placed by the user. Similar to the cassette sheet-feeding unit 230, the manual sheet-feeding unit 235 includes a pickup roller and a separation unit, and sheets S are fed one by one from the manual feeding tray 5. The sheet S fed from the manual sheet-feeding unit 235 is also conveyed to the registration roller pair 240 via the conveyance roller pairs 280 and 290.

A media sensor 100 for measuring feature amounts of the sheet S is arranged on a conveyance path between the conveyance roller pair 280 and the conveyance roller pair 290. The media sensor 100 outputs, for example, information corresponding to a basis weight and information corresponding to surface properties as feature amounts of the sheet S conveyed from the cassette sheet-feeding unit 230 or the manual sheet-feeding unit 235. The media sensor 100 may be arranged at at least one or both of a position at which the sheet S fed from the cassette sheet-feeding unit 230 can be detected and a position at which the sheet S fed from the manual sheet-feeding unit 235 can be detected. Details of the configuration of the media sensor 100 are described later.

The image forming unit 201B is of a four-drum full-color type, and includes a laser scanner 210 and four process cartridges 211. The four process cartridges 211 form toner images of four colors, specifically, yellow (Y), magenta (M), cyan (C), and black (K). Each process cartridge 211 includes a photosensitive drum 212, a charging device 213, and a developing device 214. Toner cartridges 215 are arranged above the process cartridges 211. The toner cartridges 215 replenish the respective developing devices 214 with toner.

The intermediate transfer unit 201C includes an intermediate transfer belt 216 wound around a drive roller 216*a* and a tension roller 216*b*. On an inner side of the intermediate transfer belt 216, there are provided four primary transfer rollers 219 which are in abutment against the intermediate transfer belt 216 at positions opposing the photosensitive drums 212. The intermediate transfer belt 216 is rotated in the arrow direction by the drive roller 216*a* driven by a drive unit (not shown).

The secondary transfer unit 201D includes a secondary transfer roller 217 provided so as to sandwich the intermediate transfer belt 216 at a position opposing the drive roller 216*a*. The fixing device 201E is provided on a downstream side of the secondary transfer roller 217 in the conveyance direction of the sheet S, and includes a pressure roller 220*a* and a heating roller 220*b*. On a downstream side of the fixing device 201E in the conveyance direction of the sheet S, there are arranged a first delivery roller pair 225*a*, a second delivery roller pair 225*b*, and a duplex-printing reversing unit 201F. The duplex-printing reversing unit 201F includes a reversing roller pair 222 and a re-conveyance passage R. The reversing roller pair 222 is rotatable in forward and reverse directions. The re-conveyance passage R allows the sheet S having an image formed on one side thereof to be conveyed to the image forming unit 201B.

The image forming apparatus 201 having the configuration as described above operates as follows. The image forming apparatus 201 acquires, together with an instruction to start a print job, image data from the image reading device 202 or from an external device and forms an image corresponding to the image data on the sheet S. At this time, the image forming apparatus 201 performs each step of the image formation based on operating conditions given in accordance with features of the sheet S. A print job is a series of operations performed based a print signal instructing an image to be formed on the sheet S, in which the sheet S is conveyed and an image is formed thereon, and after the image forming operation is complete, the sheet S is delivered to the placement portion 223. The image forming apparatus 201 acquires the instruction to start the print job from the operation unit 502 or an external device.

The image forming unit 201B uses the charging device 213 to uniformly charge surfaces of the photosensitive drums 212 to an electric potential having a predetermined polarity. The laser scanner 210 irradiates the uniformly charged surfaces of the photosensitive drums 212 with corresponding laser beams modulated based on the image data. In this way, electrostatic latent images for corresponding colors (yellow, magenta, cyan, and black) are formed on the respective surfaces of the photosensitive drums 212.

The image forming unit 201B uses the developing devices 214 to develop the electrostatic latent images formed on the photosensitive drums 212. The electrostatic latent images are developed on the photosensitive drums 212 with toners of corresponding colors so that toner images of the corresponding colors are formed on the photosensitive drums 212. The toner images are sequentially transferred from the photosensitive drums 212 to the rotating intermediate transfer belt 216 in superimposition by the primary transfer rollers 219. In this way, a full-color toner image is formed on the intermediate transfer belt 216. The intermediate transfer belt 216 rotates to convey the toner image to the secondary transfer unit 201D.

Concurrently with such operation of forming a toner image, the sheets S are conveyed one by one by the cassette sheet-feeding unit 230 or the manual sheet-feeding unit 235 to the registration roller pair 240. The feature amounts of the sheet S are measured by the media sensor 100 before the sheet S reaches the registration roller pair 240. The image forming apparatus 201 sets image forming conditions based on the measured feature amounts, and performs subsequent image formation based on the set image forming conditions. The image forming conditions to be set include, for example, a voltage value of secondary transfer bias applied to the secondary transfer roller 217 during transfer of the toner image to the sheet S, a fixing temperature at the time of fixing the image by the fixing device 201E, and a conveyance speed of the sheet S at the time of fixing.

The registration roller pair 240 corrects skew of the sheet S conveyed to the registration roller pair 240. After the skew is corrected, the sheet S is conveyed by the registration roller pair 240 to the secondary transfer unit 201D in synchronization with the timing at which the toner image borne on the intermediate transfer belt 216 is conveyed to the secondary transfer unit 201D. The secondary transfer unit 201D transfers the full-color toner image from the intermediate transfer belt 216 onto the sheet S with secondary transfer bias applied to the secondary transfer roller 217.

The sheet S having the toner image transferred thereto is conveyed to the fixing device 201E. The fixing device 201E sandwiches and conveys the sheet S with a roller nip portion defined by the pressure roller 220*a* and the heating roller 220*b*. The fixing device 201E heats the sheet S with the heating roller 220*b* at the time of sandwiching and conveying the sheet S, to thereby melt and mix the toners of respective colors on the sheet S. Further, the fixing device 201E presses the sheet S with the pressure roller 220*a*, to thereby fix the melted and mixed toners to the sheet S. At this time, the viscosity of the melted toner generates a sticking force to the heating roller 220*b* on the sheet S.

Figure 2A:
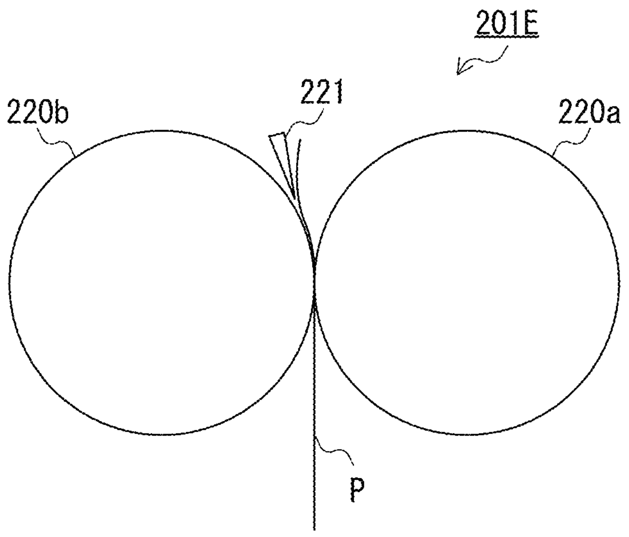
FIG. 2A and FIG. 2B are enlarged views of a fixing device.
Figure 2B:
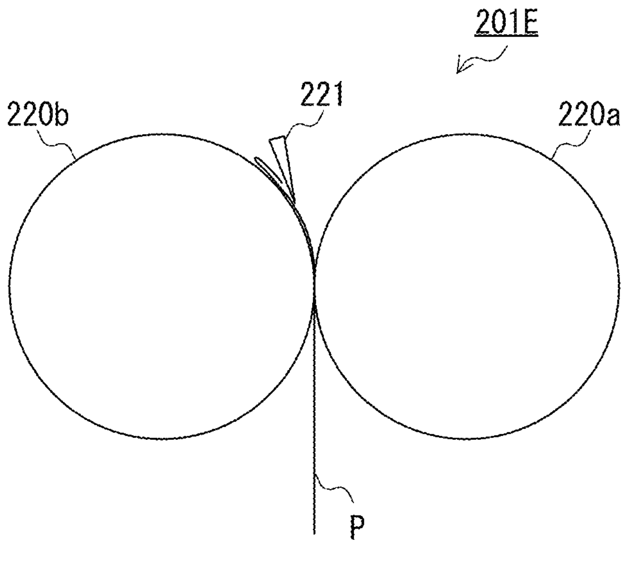

FIG. 2A and FIG. 2B are enlarged views of the fixing device 201E. In a case where the stiffness (strength) of the sheet S is small, the sticking force to the heating roller 220*b* generated on the sheet S may cause the sheet S to be rolled up by the heating roller 220*b* being rotated (FIG. 2B). Thus, a separation plate 221 which separates the sheet S is provided on a downstream side of the heating roller 220*b* in the conveyance direction of the sheet S (FIG. 2A).

The image forming apparatus 201 may determine the state of the separation plate 221 in accordance with the type and basis weight of the sheet S discriminated from the measurement results of the media sensor 100. For example, in a case where the sheet S of a type having a small stiffness is subjected to image formation, the separation plate 221 is arranged such that a distal end of the separation plate 221 is in contact with a surface of the heating roller 220*b* as illustrated in FIG. 2A, to thereby separate the sheet S from the heating roller 220*b*. In a case where the sheet S of a type having a large stiffness is subjected to image formation, the sheet S is not rolled up by the heating roller 220*b*. Thus, the separation plate 221 is arranged such that the distal end of the separation plate 221 is not in contact with the surface of the heating roller 220*b*. In this way, the surface of the heating roller 220*b* can be prevented from being worn by the separation plate 221.

The sheet S having the image fixed thereto is delivered to the delivery space D by any one of the first delivery roller pair 225*a* and the second delivery roller pair 225*b*. The sheet S is placed on the placement portion 223 provided in a protruding manner on a bottom surface of the delivery space D. In a case where images are formed on both sides of the sheet S, the sheet S having an image fixed on one side thereof is conveyed by the reversing roller pair 222 to the re-conveyance passage R. The sheet S is conveyed again to the image forming unit 201B, and an image is formed on another side of the reversed sheet S. The re-conveyance passage R allows the sheet S to be conveyed to the conveyance path between the conveyance roller pair 290 and the registration roller pair 240.

<Control Unit>

Figure 3:
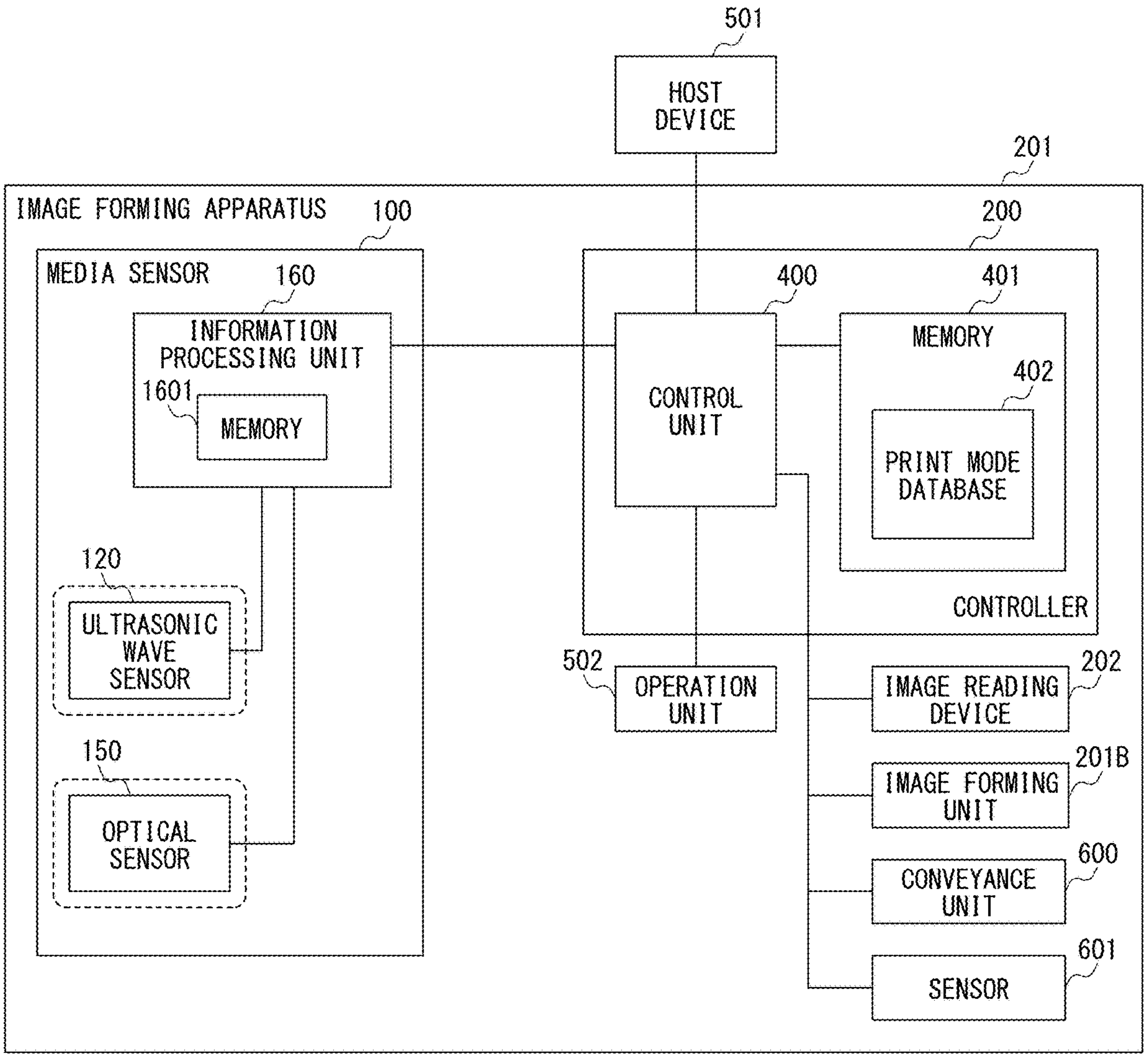
FIG. 3 is an explanatory diagram of a controller.

FIG. 3 is an explanatory diagram of a controller which controls operation of such image forming apparatus 201. A controller 200 is, for example, an information processing device including a central processing unit (CPU). The controller 200 may be achieved by, for example, a microprocessor unit (MPU) or an application specific integrated circuit (ASIC). The controller 200 controls the above-mentioned image forming operation performed by the image forming apparatus 201.

The controller 200 includes a control unit 400 and a memory 401. The memory 401 stores, for example, a control program for the image forming operation, initial values of various setting values, and various types of data required for the image forming operation. Further, the memory 401 has a storage area for storing a print mode database 402. The print mode database 402 is a database in which correspondences among features of the sheet and image forming conditions (print modes) are set in advance. Examples of the features of the sheet include the type and the basis weight of the sheet. The control unit 400 is connected to the operation unit 502, the image reading device 202, the image forming unit 201B, a conveyance unit 600, a sensor 601, and the media sensor 100. The control unit 400 can communicate to and from a host device 501, which is an external device.

The host device 501 is, for example, a personal computer, an image scanner, or a facsimile machine. The operation unit 502 inputs, for example, instructions and settings received via the input interface to the control unit 400. The operation unit 502 outputs various types of information via the output interface under the control of the control unit 400. As described above, the operation unit 502 includes the display as the output interface, and displays various types of information on the display.

The conveyance unit 600 includes the conveyance roller pairs 280 and 290, the pickup roller 2, the feed roller 3, the retard roller 4, and a motor which drives those rollers. The conveyance unit 600 also includes the registration roller pair 240, the secondary transfer roller 217, the pressure roller 220*a*, the heating roller 220*b*, and a motor which drives those rollers. Further, the conveyance unit 600 includes the first delivery roller pair 225*a*, the second delivery roller pair 225*b*, the reversing roller pair 222, other rollers which convey the sheet S in the image forming apparatus 201, and a motor that drives those rollers. The conveyance unit 600 controls feeding of the sheet S by driving and controlling each motor under the control of the control unit 400.

The control unit 400 acquires an instruction to start a print job from the host device 501 or the operation unit 502, and starts the print job. The control unit 400 acquires image data from the host device 501 or the image reading device 202, and performs image processing on the acquired image data. The control unit 400 executes the print job by causing the image forming unit 201B to form a toner image based on the image data that has been subjected to image processing, and causing the conveyance unit 600 to feed the sheet S.

The media sensor 100 includes an information processing unit 160, an ultrasonic wave sensor 120, and an optical sensor 150. In the at least one embodiment, the ultrasonic wave sensor 120 and the optical sensor 150 are used as a sheet measurement unit. The information processing unit 160 includes a memory 1601. The information processing unit 160 is an information processing device achieved by, for example, a CPU, an MPU, or an ASIC. In the at least one embodiment, the media sensor 100 has a function of detecting the leading edge and the trailing edge of the conveyed sheet S. The media sensor 100 can detect the leading edge and the trailing edge of the sheet S by using any one or both of the ultrasonic wave sensor 120 and the optical sensor 150.

The image forming conditions (for example, conveyance speed at the time of fixing, target fixing temperature, and transfer voltage at the time of secondary transfer) differ depending on the physical properties (for example, basis weight, stiffness, surface properties, and the material) of the sheet S on which the image is to be formed. Thus, it is required to set in advance the image forming conditions in accordance with the feature amounts of the sheet S to be used at the time of image formation.

Depending on the type of the sheet S, there may be some limitations in setting the sheet S to a feeding port (sheet-feeding cassette 1 or manual feeding tray 5). For example, some thick paper sheets having a high stiffness can be fed only from the manual feeding tray 5 with a conveyance path having a small curvature. Coated paper sheets having a smooth surface texture and a strong adhesion between sheets are required to be fed one by one from the manual feeding tray 5 in order to prevent a plurality of sheets from being conveyed on top of each other. Paper sheets made of pulp as a raw material generally have different bending stiffnesses in length and width directions because of bias in orientation directions of pulp fibers (fiber orientation) that occurs due to a manufacturing method. Thus, there is given a recommended orientation of the sheet in length and width directions at the time of setting the sheet to the feeding port so that the bending stiffness against the bending in the conveyance path becomes smaller. Further, for one-side coated paper sheets obtained by coating only one side of a plain paper sheet, an orientation in up-and-down directions is designated at the time of setting in order to perform printing on the coated side.

There are also some types of sheets which cannot be used in the image forming apparatus 201. For example, in a case of a thick paper sheet having an excessively high stiffness, conveyance of the sheet may be stopped due to resistance generated at the time of conveying the sheet along a bent conveyance path. A thin paper sheet having an excessively low stiffness is strongly affected by the sticking force generated between the melted toner and the heating roller 220*b* at the time of passage through the fixing device 201E. Thus, there is a possibility that the sheet cannot be separated from the heating roller 220*b* by the separation plate 221 and is directly wound around the heating roller 220*b* (FIG. 2B). Further, in a case of a synthetic paper sheet which is not made of pulp but of a synthetic resin as a raw material, there is a possibility that the sheet is melted by heating in the fixing device 201E and thereby contaminate the heating roller 220*b*.

Thus, in order to perform image formation appropriately, it is important to identify the type of the sheet S to be used based on the feature amounts of the sheet S before image formation. Therefore, it is required for the media sensor 100 to measure the feature amounts of the sheet S before the sheet S is conveyed to the secondary transfer unit 201D. Operation of the media sensor 100 is controlled by the information processing unit 160, and the processing of the measurement results of each of the ultrasonic wave sensor 120 and the optical sensor 150 is performed by the information processing unit 160. The information processing unit 160 operates under the control of the control unit 400, and transmits the feature amounts of the sheet S obtained from the measurement results of each of the ultrasonic wave sensor 120 and the optical sensor 150 to the control unit 400.

The media sensor 100 can detect the sheet S conveyed by the conveyance roller pair 280. The control unit 400 and the information processing unit 160 start a sheet measurement sequence in response to the detection of the sheet S by the media sensor 100. Through starting the sheet measurement sequence, the control unit 400 and the information processing unit 160 cause the ultrasonic wave sensor 120 and the optical sensor 150 to perform measurement operations.

The ultrasonic wave sensor 120 measures the sheet S by using ultrasonic waves, and outputs an output value of a predetermined voltage value as a measurement result. The information processing unit 160 acquires the output value of the ultrasonic wave sensor 120, and derives the transmittance of the sheet S from the output value given when the sheet S is present and the output value given when the sheet S is not present. The information processing unit 160 detects information corresponding to the basis weight from the transmittance of the sheet S. The optical sensor 150 is, for example, a contact image sensor (CIS). The information processing unit 160 stores, in the memory 1601, a luminance value of each pixel as an imaging result obtained by the optical sensor 150. The information processing unit 160 converts the luminance value of each pixel stored in the memory 1601 into information corresponding to surface properties such as a difference integrated value, which is the sum of the differences in luminance values of adjacent pixels, and a brightness.

The information processing unit 160 transmits information corresponding to the basis weight and information corresponding to the surface properties to the control unit 400. The control unit 400 determines the type of the sheet S (paper type, paper type information) based on the acquired information corresponding to the basis weight and information corresponding to the surface properties. The control unit 400 determines one image forming condition (print mode) corresponding to the type of the sheet S from among a plurality of print modes stored in the print mode database 402. The control unit 400 displays information on the determined print mode on the display of the operation unit 502. The print modes are operation modes for controlling image formation under image forming conditions determined in advance (for example, secondary transfer bias value, target fixing temperature of the fixing device 201E, and conveyance speed during fixing). The print modes are named by sheet type, such as "thin paper sheet 1," "thin paper sheet 2," "plain paper sheet 1," "coated paper sheet 1," "coated paper sheet 2," and "coated paper 3." The description given here relates to a method of determining the image forming conditions based on the type of the sheet S, but the method is not limited to this. For example, the control unit 400 determines the type of the sheet S (paper type, paper type information) based on the acquired information corresponding to the surface properties. The control unit 400 may determine one image forming condition (print mode) corresponding to the type of the sheet S and information corresponding to the basis weight from among the plurality of print modes stored in the print mode database 402.

<Configuration of Media Sensor>

Figure 4:
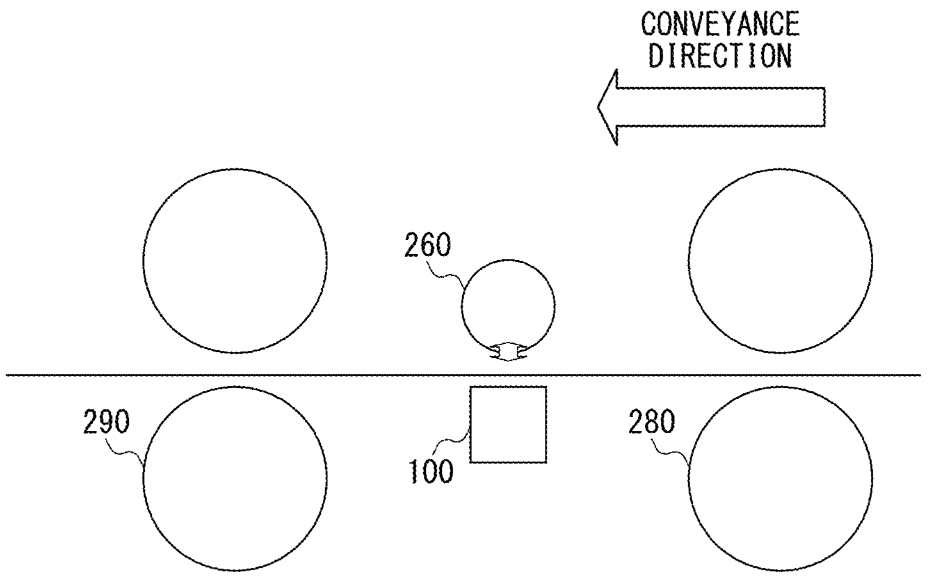
FIG. 4 is an explanatory view of a configuration of a media sensor.
Figure 5:
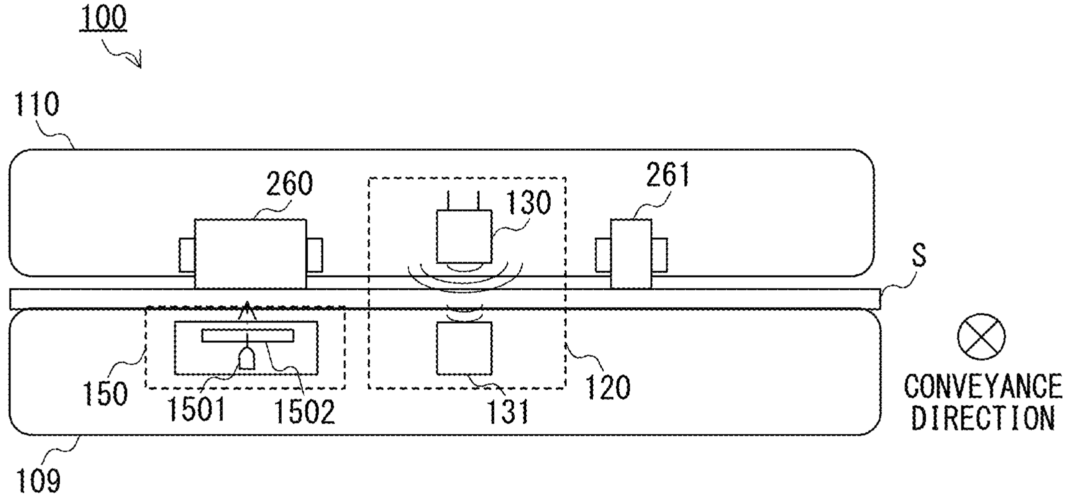
FIG. 5 is an explanatory view of a configuration of a media sensor.

FIG. 4 and FIG. 5 are explanatory views of the configuration of the media sensor 100. FIG. 4 is a view of the media sensor 100 viewed from a direction orthogonal to the conveyance direction of the sheet S. FIG. 5 is a view of the media sensor 100 viewed from the upstream side in the conveyance direction of the sheet S.

As illustrated in FIG. 4, the media sensor 100 is arranged between the conveyance roller pair 280 and the conveyance roller pair 290, and acquires information corresponding to the basis weight of the conveyed sheet S and information corresponding to the surface properties of the conveyed sheet S. A media-sensor-facing roller 260 is arranged at a position facing the media sensor 100 with respect to the conveyance path of the sheet S. The media-sensor-facing roller 260 is configured so as to move in a direction toward the media sensor 100 and in a direction away from the media sensor 100.

As illustrated in FIG. 5, in the media sensor 100, the ultrasonic wave sensor 120 and the optical sensor 150 are arranged at the same position in the conveyance direction of the sheet S, and are arranged side by side in the direction orthogonal to the conveyance direction. The ultrasonic wave sensor 120 includes an ultrasonic wave transmitter 130 and an ultrasonic wave receiver 131. The optical sensor 150 is a CIS including a light source 1501 (for example, an LED) and a line sensor 1502, which are a light emitter and a light receiver, respectively. The optical sensor 150 may be configured by using a CCD image sensor or a CMOS image sensor.

The optical sensor 150 measures the luminance value of received light. For this purpose, it is required that the sheet S be held at an optical focus position of the optical sensor 150. When the ultrasonic wave sensor 120 measures the sheet S, measurement accuracy is improved when there is no influence due to fluttering of the conveyed sheet S. For this reason, it is required that the sheet S be conveyed with a stable posture.

In the at least one embodiment, in order to convey the sheet S with a stable posture, the media-sensor-facing roller 260 and a sheet pressing roller 261 are arranged between the conveyance roller pair 280 and the conveyance roller pair 290. The media-sensor-facing roller 260 and the sheet pressing roller 261 are arranged at the same position in the conveyance direction of the sheet S. The media-sensor-facing roller 260 is arranged facing the optical sensor 150 across the conveyance path, and is configured to press the sheet S toward the optical sensor 150. As a result, variation in the position and the posture of the sheet S is reduced in a case where the media sensor 100 measures the surface of the sheet S. Thus, the media sensor 100 can measure feature amounts of the sheet S, such as the surface properties and the basis weight, under a stable state. The sheet pressing roller 261 is arranged at a position at which the ultrasonic wave sensor 120 is sandwiched between the sheet pressing roller 261 and the media-sensor-facing roller 260.

<Measurement of Basis Weight>

In the ultrasonic wave sensor 120, the ultrasonic wave transmitter 130 and the ultrasonic wave receiver 131 are arranged at opposing positions across the conveyance path. The ultrasonic wave transmitter 130 is arranged on an upper block 110 side of the media sensor 100. The ultrasonic wave receiver 131 is arranged on a lower block 109 side of the media sensor 100. The ultrasonic wave sensor 120 receives ultrasonic waves output from the ultrasonic wave transmitter 130 via the conveyance path of sheet S by the ultrasonic wave receiver 131. The ultrasonic wave receiver 131 outputs information (output value) for determining the basis weight of the sheet S based on the received ultrasonic waves.

The ultrasonic wave transmitter 130 and the ultrasonic wave receiver 131 are each formed of a piezoelectric element (also referred to as "piezo element"), which is an element for mutual conversion between a mechanical displacement and an electric signal, and an electrode terminal. The ultrasonic wave transmitter 130 generates ultrasonic waves through oscillation of the piezoelectric element in response to input of a pulse voltage having a predetermined frequency to the electrode terminal. The generated ultrasonic waves propagate through air. Upon arrival of the ultrasonic waves to the sheet S, the ultrasonic waves cause the sheet S to vibrate. The ultrasonic waves generated in the ultrasonic wave transmitter 130 propagate to the ultrasonic wave receiver 131 via the sheet S. The piezoelectric element of the ultrasonic wave receiver 131 causes the electrode terminal to generate an output voltage corresponding to an amplitude of the received ultrasonic waves. The output voltage has a voltage value corresponding to the basis weight of the sheet S. The output voltage is transmitted as an output value to the information processing unit 160.

The ratio between the output voltage given when the sheet S is not present and the output voltage given when the sheet S is present between the ultrasonic wave transmitter 130 and the ultrasonic wave receiver 131 is the transmittance. The transmittance of the ultrasonic waves changes in accordance with the basis weight (area density) of the sheet S. Thus, the basis weight of the sheet S can be estimated by using a conversion formula or a conversion table between transmittance and basis weight.

<Measurement of Surface Properties>

Figure 6A:
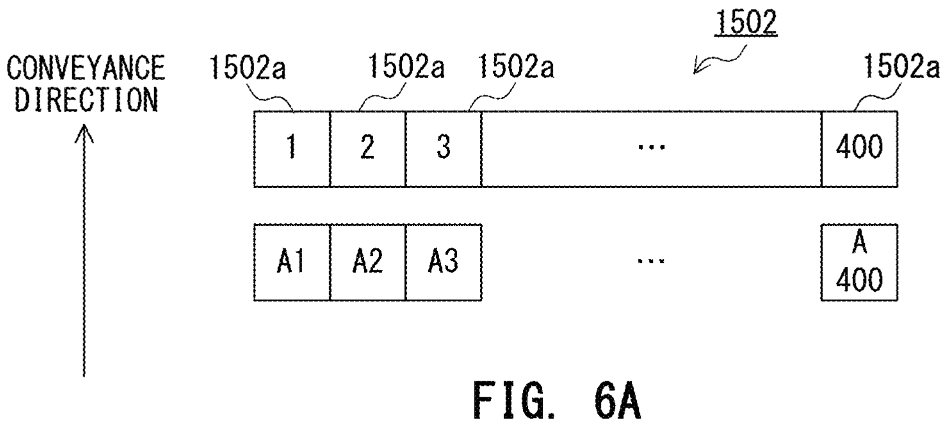
FIG. 6A and FIG. 6B are explanatory diagrams of a reading result obtained by an optical sensor.
Figure 6B:
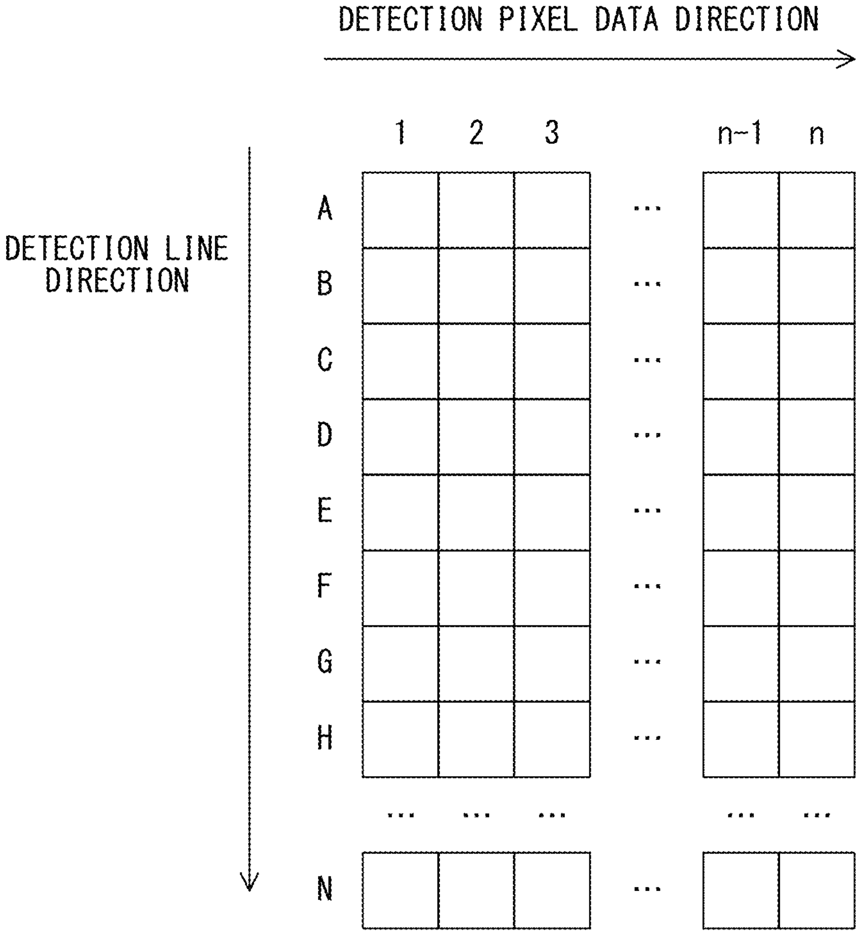

The surface properties of the sheet S are detected by using the optical sensor 150. Light emitted from the light source 1501 illuminates the sheet S at a constant angle by a light guide (not shown). The sheet S reflects the irradiated light. The light reflected by the sheet S forms an image on the line sensor 1502 via a lens (not shown). In this way, the line sensor 1502 can read the light reflected from sheet S as an image. FIG. 6A and FIG. 6B are explanatory diagrams of a reading result obtained by the optical sensor 150.

In FIG. 6A, an example of an image read by the line sensor 1502 is illustrated. The line sensor 1502 includes a plurality of light receiving elements 1502*a*. The plurality of light receiving elements 1502*a* are arranged in a direction orthogonal to the conveyance direction of the sheet S, and thus the line sensor 1502 can read an image corresponding to one line at a time. In the example of FIG. 6A, 400 light receiving elements 1502*a* are arranged, and the line sensor 1502 can thus read an image of 400 pixels (A1 to A400) at a time.

In the at least one embodiment, a plurality of light receiving elements 1502*a* are arranged to achieve a resolution of 300 dpi. The image corresponding to one line which is read at a time by the line sensor 1502 is insufficient as the information amount for determining the surface properties of the sheet S. This is because in an image corresponding to one line, there is a large deviation in the reading results of each reading position. For that reason, the optical sensor 150 performs the reading operation a plurality of times on the conveyed sheet S, and acquires the reading results of the images of a plurality of lines of the sheet S. Through connecting the reading results of a plurality of lines in the conveyance direction of the sheet S, it becomes possible to determine the trend of the surface properties of the sheet S for a predetermined size.

The information processing unit 160 performs digital processing on the image read by the optical sensor 150, and stores the results of the digital processing in the memory 1601 as an output value (luminance value) of each pixel. The information processing unit 160 acquires an integrated difference value, a brightness, and a peak-to-peak (PP) value of the luminance value from the luminance value of each pixel stored in the memory 1601, and stores those pieces of information in the memory 1601.

The integrated difference value is a value obtained by summing the results of integrating the difference in the luminance values of each adjacent pixel of the image read by the line sensor 1502 for the number of lines. The integrated difference value is an index expressing the unevenness of the sheet. In FIG. 6B, when the detection value of each pixel is represented by a pixel position (1 to n) and a detection line (A to N), a difference integrated value Y is expressed based on the following equation (1) by using a difference integrated value "k" for each line. The detection pixel data direction of FIG. 6B is the arrangement direction of the light receiving elements 1502*a* of the line sensor 1502 (the direction of one line of pixels). Further, the detection line direction of FIG. 6B is the conveyance direction of the sheet S.

$$
\begin{aligned}
k1 &= |A2 - A1| + |A3 - A2| \ \ldots + |An - A(n-1)| \\
k2 &= |B2 - B1| + |B3 - B2| \ \ldots + |Bn - B(n-1)| \\
&\vdots \\
kN &= |n2 - n1| + |n3 - n2| \ \ldots + |Nn - N(n-1)| \\
Y &= k1 + k2 + \ldots + kN
\end{aligned}
\quad (1)
$$

The brightness is the sum of the integrated values of the luminance value of each pixel received by the line sensor 1502 for the number of detection lines, and represents the brightness of the surface of the sheet S. A brightness M is expressed by the following equation (2).

$$
M = A1 + A2 + \ldots + B1 + B2 + \ldots + G1 + G2 + \ldots + Nn \quad (2)
$$

The PP value is a value obtained by summing the difference between the maximum value and the minimum value of the luminance value of one line for the number of detection lines. A transparent film made of a resin such as PET reflects less of the light irradiated from the light source 1501, and is detected as having a low brightness. For a sheet such as an embossed paper sheet having a surface which has been intentionally provided with geometrical unevenness, the unevenness increases the difference in luminance between adjacent pixels, resulting in a large integrated difference value. For a recycled paper sheet, the luminance value is uneven in the fiber orientation, and the pulp fibers become shorter after going through several recycling processes, and thus the surface properties tend to be detected as being rough. Meanwhile, for a coated paper sheet, the coating layer on the surface causes the paper sheet to appear less uneven, and the integrated difference value tends to be smaller. The brightness and the PP value are parameters used to discriminate those sheets.

The control unit 400 acquires the basis weight, the integrated difference value, the brightness, and the PP value as the feature amounts of the sheet S from the information processing unit 160, and refers to the print mode database 402 to determine the print mode. The control unit 400 performs image formation corresponding to the print job by using the image forming conditions based on the determined print mode.

<Position Control of Media-Sensor-Facing Roller>

As described above, the media-sensor-facing roller 260 is configured to move in a direction toward the media sensor 100 (optical sensor 150) and in a direction away from the media sensor 100. That is, the media-sensor-facing roller 260 is movable between a first position separated from the optical sensor 150 and a second position closer to the optical sensor 150 than the first position. The media-sensor-facing roller 260 presses the sheet S toward the optical sensor 150 by moving to the second position. In a case where the media-sensor-facing roller 260 is at the second position, the sheet S is preferably pressed against the optical sensor 150. In this way, the media-sensor-facing roller 260 is a rotating member which functions as a pressing member for pressing the sheet S toward the optical sensor 150. The same applies to the sheet pressing roller 261.

Figure 7:
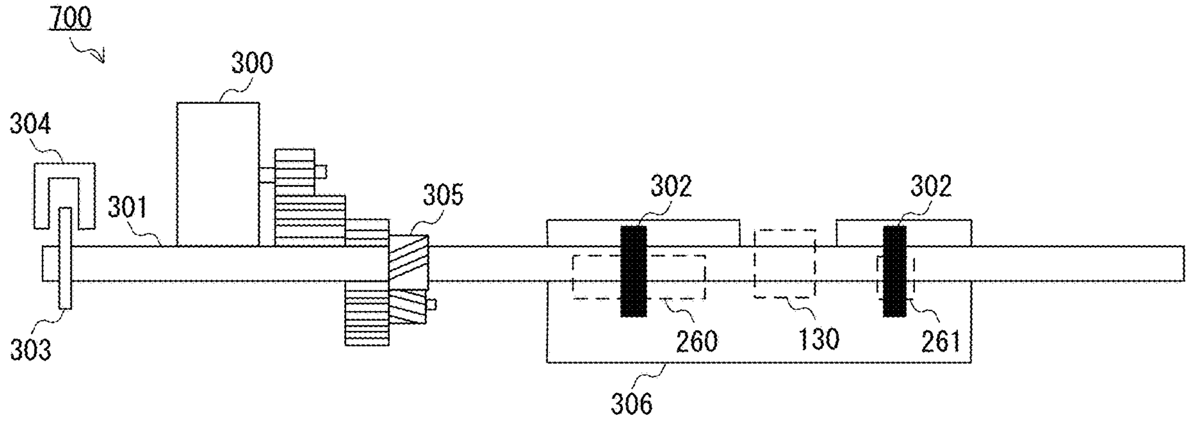
FIG. 7 is a configuration view of a moving mechanism.

FIG. 7 is a configuration view of a moving mechanism which moves the media-sensor-facing roller 260 and the sheet pressing roller 261. FIG. 7 is a view as viewed from above (upper block 110 side of) the media-sensor-facing roller 260 and the sheet pressing roller 261. A moving mechanism 700 includes a motor 300, a rotating shaft 301, a cam 302, a detection plate 303, a rotation detection sensor 304, a gear 305, and a mounting plate 306. The media-sensor-facing roller 260 and the sheet pressing roller 261 are attached to the mounting plate 306. The ultrasonic wave transmitter 130 of the ultrasonic wave sensor 120 is not mounted to the mounting plate 306, but is fixed to the upper block 110 of the media sensor 100.

In a case where the motor 300 is rotationally driven by the control unit 400, the gear 305 rotates. The rotation of the gear 305 causes the rotating shaft 301 to rotate. The rotation of the rotating shaft 301 causes the cam 302 and the detection plate 303 to rotate. The rotation of the cam 302 causes the mounting plate 306 to move up and down. As the mounting plate 306 moves up and down, the media-sensor-facing roller 260 and the sheet pressing roller 261 move. As a result, the media-sensor-facing roller 260 and the sheet pressing roller 261 move synchronously between the first position and the second position.

The positions of the media-sensor-facing roller 260 and the sheet pressing roller 261 are detected by using the rotation detection sensor 304. The rotation detection sensor 304 is a photointerrupter. The rotation detection sensor 304 includes a light emitter and a light receiver arranged facing each other, and is configured so that the light receiver receives light output from the light emitter. The positions of the media-sensor-facing roller 260 and the sheet pressing roller 261 are determined based on whether or not the light output from the light emitter is blocked by the detection plate 303. For example, the rotation detection sensor 304 outputs a detection signal in a first state in a case where the light is not blocked, and outputs a detection signal in a second state different from the first state in a case where the light is blocked.

Figure 8A:
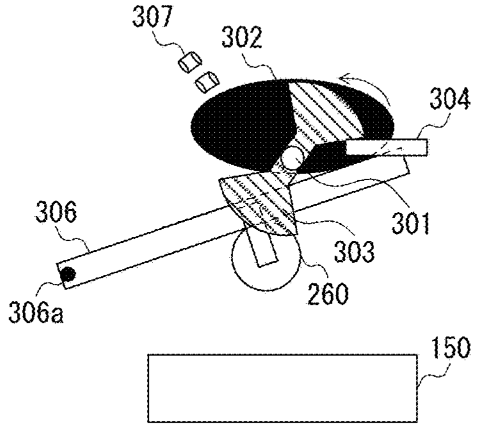
FIG. 8A and FIG. 8B are explanatory views of operation of the moving mechanism.
Figure 8B:
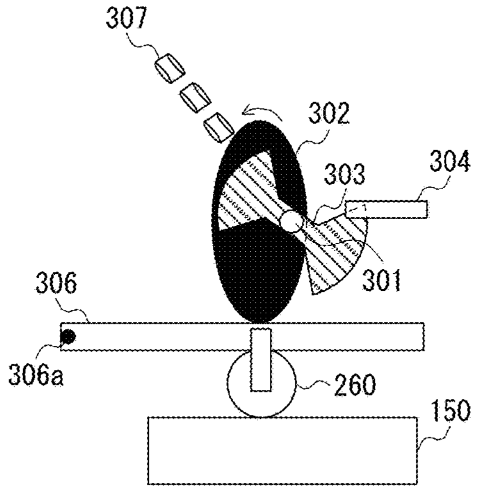

FIG. 8A and FIG. 8B are explanatory views of operation of the moving mechanism 700. Here, description of an operation in which the moving mechanism 700 moves the media-sensor-facing roller 260 is given, but the same operation applies to the sheet pressing roller 261. FIG. 8A and FIG. 8B are views of the moving mechanism 700 as viewed from the detection plate 303 side (direction orthogonal to the conveyance direction of the sheet S). The motor 300 and the gear 305 are not shown. In FIG. 8A, a state is illustrated in which the media-sensor-facing roller 260 has moved to the first position separated from the optical sensor 150. In FIG. 8B, a state is illustrated in which the media-sensor-facing roller 260 has moved to the second position at which the media-sensor-facing roller 260 presses the sheet S against the optical sensor 150.

The mounting plate 306 is configured to rotate around a rotating shaft 306*a*. The mounting plate 306 is connected to a spring 307, and is urged in a direction away from the optical sensor 150 by the spring 307. The rotation angle of the mounting plate 306 changes depending on the rotational position of the cam 302 and the spring 307. As the rotation angle of the mounting plate 306 changes, the position of the media-sensor-facing roller 260 changes between the first position (FIG. 8A) and the second position (FIG. 8B).

The rotational position of the cam 302 can be determined based on whether or not the light from the rotation detection sensor 304 is blocked by the detection plate 303 mounted to the rotating shaft 301. The detection plate 303 has an array shape, as illustrated. In a case where the detection plate 303 rotates together with the rotating shaft 301, the detection signal output from the rotation detection sensor 304 changes. The rotational position of the cam 302 is detected based on the state of the detection signal. For example, the media-sensor-facing roller 260 is at the first position in a case where the detection signal switches from the second state to the first state (FIG. 8A), and is at the second position in a case where the detection signal switches from the first state to the second state (FIG. 8B). Through stopping the rotational driving of the motor 300 at each timing, the media-sensor-facing roller 260 stops at the first position or the second position.

Figure 9:
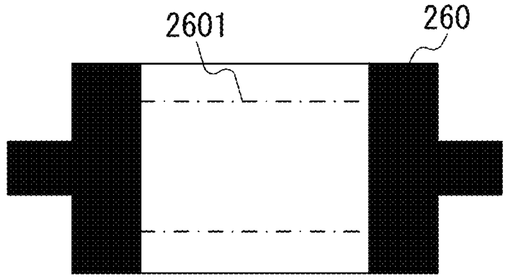
FIG. 9 is a configuration view of a media-sensor-facing roller.
Figure 10A:
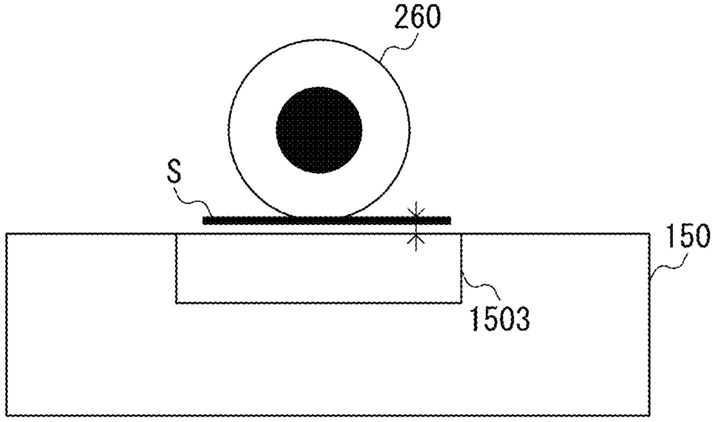
FIG. 10A and FIG. 10B are each an explanatory view of a role of the media-sensor-facing roller.
Figure 10B:
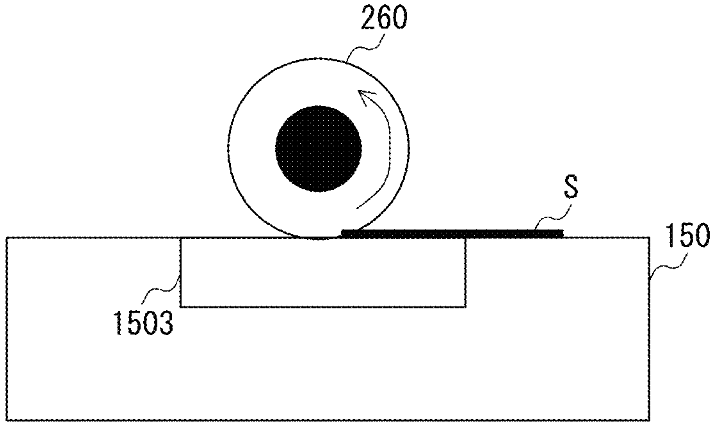

FIG. 9 is a configuration view of the media-sensor-facing roller 260. The media-sensor-facing roller 260 has a dumb-bell shape, and a sponge material 2601 serving as a cleaning member is wrapped around a center portion of the media-sensor-facing roller 260. The media-sensor-facing roller 260 has two roles. FIG. 10A and FIG. 10B are each an explanatory view of a role of the media-sensor-facing roller 260.

The first role of the media-sensor-facing roller 260 is to maintain the distance between the sheet S and a light guide 1503 of the optical sensor 150 during sheet conveyance (FIG. 10A). The media-sensor-facing roller 260 maintains the distance between the sheet S and the light guide 1503 and suppresses fluctuation (flapping) in the position of the sheet S by pressing the sheet S against the light guide 1503 of the optical sensor 150. Thus, the optical sensor 150 can measure the sheet S while the sheet S is stable. The second role of the media-sensor-facing roller 260 (cleaning) is to wipe the surface of the light guide 1503 with the sponge material 2601 to remove paper dust by rotating after the sheet has passed (FIG. 10B). As described above, the light guide 1503 is used to irradiate the sheet S with the light emitted from the light source 1501 at a fixed angle.

Figure 11:
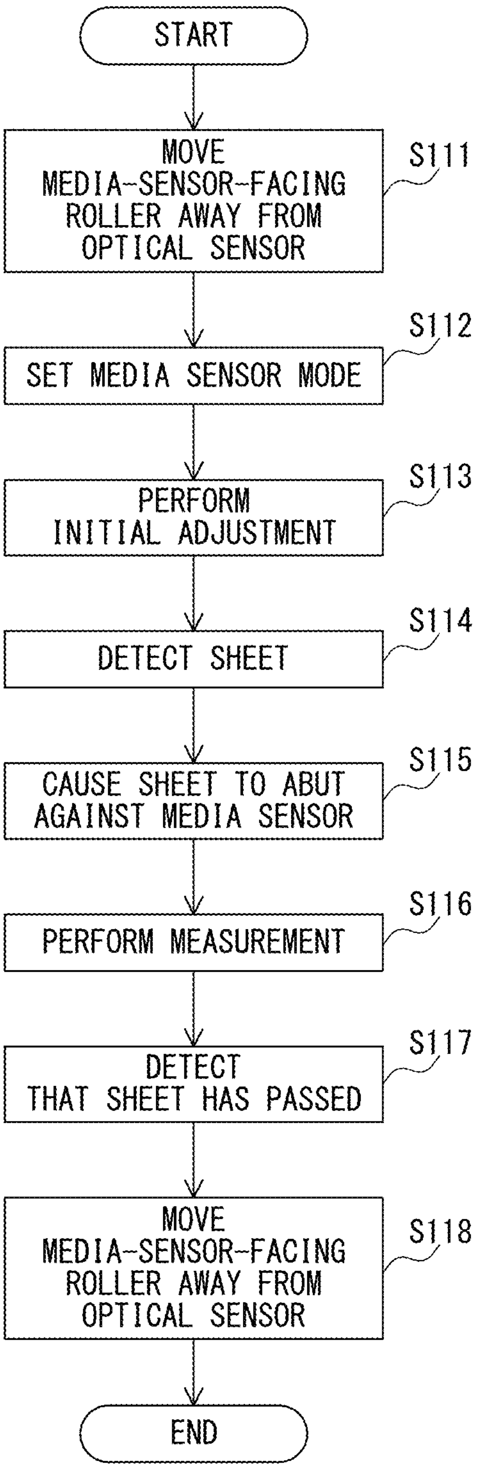
FIG. 11 is a processing flowchart for illustrating movement processing of the media-sensor-facing roller.
Figure 12A:
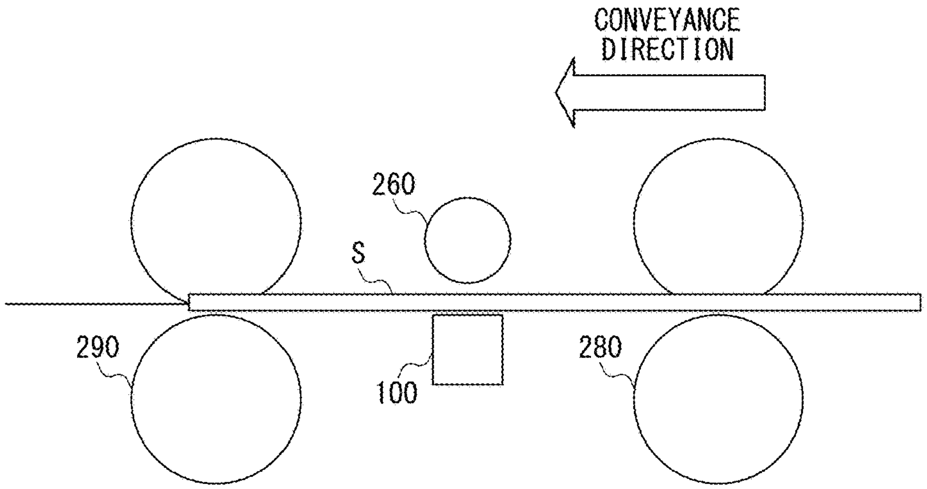
FIG. 12A, FIG. 12B, and FIG. 12C are explanatory views of operation during movement processing of the media-sensor-facing roller.
Figure 12B:
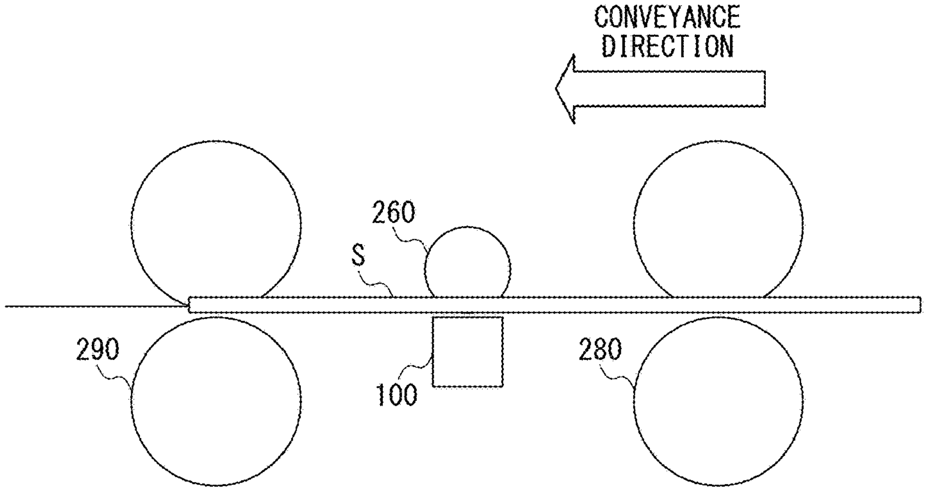
Figure 12C:
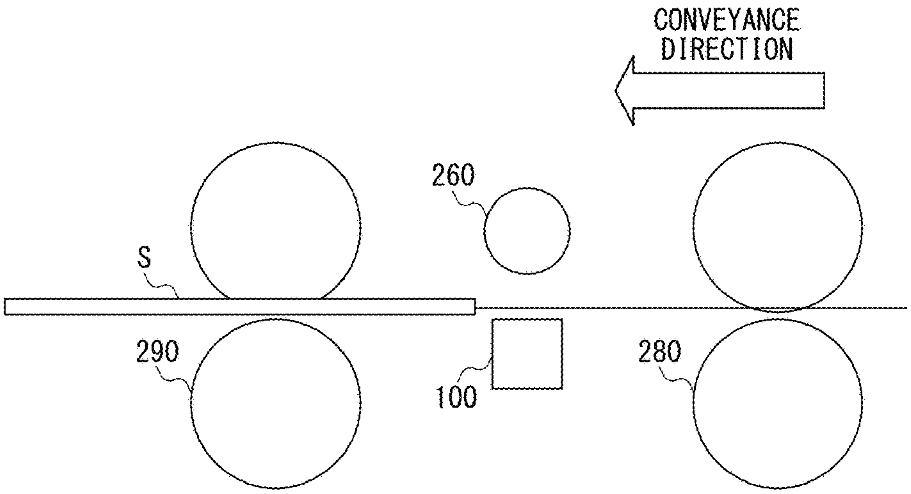

FIG. 11 is a processing flowchart for illustrating movement processing of the media-sensor-facing roller 260. The processing is processing performed in a case where the image forming apparatus 201 is activated or returns from a sleep state to perform a print job. It is noted that in a case where the movement of the media-sensor-facing roller 260 is controlled, the movement of the sheet pressing roller 261 is also controlled in the same way. FIG. 12A to FIG. 12C are explanatory views of operation of the media-sensor-facing roller 260 during the movement processing. Here, description of a case in which the control unit 400 performs the processing is given, but the processing may also be executed by the information processing unit 160 under the control of the control unit 400.

In a case where the image forming apparatus 201 is activated or returns from the sleep state, the control unit 400 rotationally drives the motor 300 to move the media-sensor-facing roller 260 to the first position so as not to hinder the conveyance of the sheet S (Step S111). This causes the media-sensor-facing roller 260 to move away from the optical sensor 150 (FIG. 8A). In an operating mode in which the feature amounts of the sheet S are not measured, the media-sensor-facing roller 260 is maintained at the first position. In a media sensor mode for measuring the feature amounts of the sheet S, the media-sensor-facing roller 260 is movable between the first position and the second position.

In a case where the media sensor mode is set (Step S112), the control unit 400 performs an initial adjustment such as calibration of the optical sensor 150 (Step S113). An instruction for the media sensor mode can be given from the operation unit 502, for example. At the start of the initial adjustment, the control unit 400 rotationally drives the motor 300 to move the media-sensor-facing roller 260 to the second position so as to abut against the optical sensor 150. After the initial adjustment ends, the control unit 400 rotationally drives the motor 300 to move the media-sensor-facing roller 260 to the first position and away from the optical sensor 150.

In the initial adjustment, the media sensor 100 is activated and measurement is performed by the ultrasonic wave sensor 120 under a state in which the sheet is not present. The measurement in a state in which the sheet is not present is processing for detecting a change in output due to a change in the environment, for example, temperature, by performing ultrasonic wave measurement under a state in which the sheet S has not been conveyed. The result of the measurement in a state in which the sheet is not present is used to correct for environmental effects during ultrasonic wave measurement. Further, in the initial adjustment, black measurement of the optical sensor 150 is performed to detect dark current. The light amount of the optical sensor 150 is adjusted based on the dark current. At this time, the media-sensor-facing roller is at the second position, and hence the influence of external light is suppressed.

In a case where the initial adjustment ends, the control unit 400 waits until an instruction to start a print job is acquired. In a case where the control unit 400 acquires the instruction to start a print job, the conveyance unit 600 starts conveyance of the sheet S. In a case where the media sensor 100 detects the leading edge of the sheet S after the sheet S starts to be conveyed, the control unit 400 stops the conveyance of the sheet S by the conveyance unit 600 (Step S114). In FIG. 12A, a state in which conveyance of the sheet S has stopped is illustrated. The sheet S reaches the measurement position by the media sensor 100, the leading edge is conveyed to the conveyance roller pair 290, and conveyance is stopped. The sheet S is in a state in which a predetermined tension is applied thereto by the conveyance roller pair 280 and the conveyance roller pair 290, and wrinkles on the surface are smoothed out.

The control unit 400, which has stopped the conveyance of the sheet S, rotationally drives the motor 300 to move the media-sensor-facing roller 260 to the second position, and causes the sheet S to abut against the media sensor 100 (Step S115). In this method, during conveyance of the sheet S to the measurement position of the media sensor 100, the media-sensor-facing roller 260 is at the first position, and thus does not hinder the conveyance of the sheet S. Further, during measurement of the sheet S by the media sensor 100, the media-sensor-facing roller 260 presses the sheet S against the media sensor 100 at the second position to stabilize the posture of the sheet S.

The control unit 400, which has caused the media-sensor-facing roller 260 to abut against the media sensor 100, confirms that the media-sensor-facing roller 260 is in abutment against the media sensor 100 based on the detection result of the rotation detection sensor 304. For example, the control unit 400 confirms that the media-sensor-facing roller 260 (sheet S) is in abutment against the media sensor 100 in a case where the detection signal output from the rotation detection sensor 304 has switched from the first state to the second state. After confirming that the media-sensor-facing roller 260 (sheet S) is in abutment against the media sensor 100, the control unit 400 restarts the conveyance of the sheet S by the conveyance unit 600 (FIG. 12B).

At the same time as restarting the conveyance of the sheet S, the control unit 400 performs processing for measuring the feature amounts of the sheet S by the media sensor 100 (Step S116). The media sensor 100 performs ultrasonic wave measurement by using the ultrasonic wave sensor 120, and derives a transmittance based on the measurement result. The control unit 400 derives the basis weight of the sheet S based on the transmittance by using a table or mathematical formula expressing the relationship between the transmittance and the basis weight. The media sensor 100 measures the surface properties of the sheet S by using the optical sensor 150, and derives the integrated difference value and the brightness. The control unit 400 discriminates the type of the sheet S based on the integrated difference value and the brightness. The control unit 400 refers to the print mode database to determine the print mode based on the basis weight and the type of the sheet S, and sets image forming conditions based on the determined print mode. The control unit 400 stops the media sensor 100 in a case where the measurement of the feature amounts of the sheet S ends.

Then, the control unit 400 detects that the trailing edge of the sheet S has passed the measurement position of the media sensor 100 by using the media sensor 100 (Step S117). In FIG. 12C, a state in which the sheet S has passed the measurement position of the media sensor 100 is illustrated. When the trailing edge of the sheet S passes the measurement position of the media sensor 100, the control unit 400 rotationally drives the motor 300 to move the media-sensor-facing roller 260 to the first position (Step S118). This causes the media-sensor-facing roller 260 to move away from the optical sensor 150. That is, the control unit 400 causes the media-sensor-facing roller 260 to move away from the optical sensor 150 after a predetermined period of time has elapsed since detecting that the trailing edge of the sheet S has passed. As a result, the media-sensor-facing roller 260 can clean the surface of the optical sensor 150 for a predetermined period of time with the sponge material 2601 in abutment against the surface of the optical sensor 150. Other than when the feature amounts of the sheet S are measured, the media-sensor-facing roller 260 is constantly on standby at the first position so as not to hinder the conveyance of the sheet S.

In this way, the detection of the sheet S by the media sensor 100 triggers measurement of the feature amounts of the sheet S, and the position of the media-sensor-facing roller 260 is controlled. As a result, it is possible to prevent conveyance of the sheet S being hindered by the media-sensor-facing roller 260, suppress flapping of the sheet S, and thus accurately measure the feature amounts of the sheet S, without providing a sensor dedicated to detecting the position of the sheet S.

Description of the detection of the sheet S performed in the processing step of Step S114 is now given. The sheet S can be detected by using any one of the ultrasonic wave sensor 120 and the optical sensor 150. Here, a case in which the ultrasonic wave sensor 120 is used is described.

In a case where the ultrasonic wave sensor 120 is used, the ultrasonic wave sensor 120 detects the leading edge and the trailing edge of the sheet S by transmitting and receiving ultrasonic waves via the conveyance path. The amplitude of the ultrasonic waves received by the ultrasonic wave receiver 131 changes depending on the presence or absence of the sheet S, and a difference occurs in the output voltage which is output from the ultrasonic wave receiver 131. The presence or absence of the sheet S can be determined based on this difference in output voltage.

When the sheet S is not present between the ultrasonic wave transmitter 130 and the ultrasonic wave receiver 131, the ultrasonic waves are not attenuated by the sheet S. As a result, the output voltage is higher than when the sheet S is present. Conversely, when the sheet S is present between the ultrasonic wave transmitter 130 and the ultrasonic wave receiver 131, the ultrasonic waves are attenuated by the sheet S. As a result, the output voltage becomes lower than when the sheet S is absent.

The information processing unit 160 sets a threshold value (threshold voltage) for determining the presence or absence of the sheet S, compares the output voltage acquired from the ultrasonic wave receiver 131 with the threshold value (threshold voltage), and determines the presence or absence of the sheet S based on the comparison result. For example, in a case where the output voltage is larger than the threshold value, it is determined that the sheet S is absent, and in a case where the output voltage is equal to or less than the threshold value, it is determined that the sheet S is present. The leading edge of the sheet S is detected in a case where the output voltage changes from a state larger than the threshold value to a state equal to or less than the threshold value. The trailing edge of the sheet S is detected in a case where the output voltage changes from a state equal to or less than the threshold value to a state larger than the threshold value.

Figure 13:
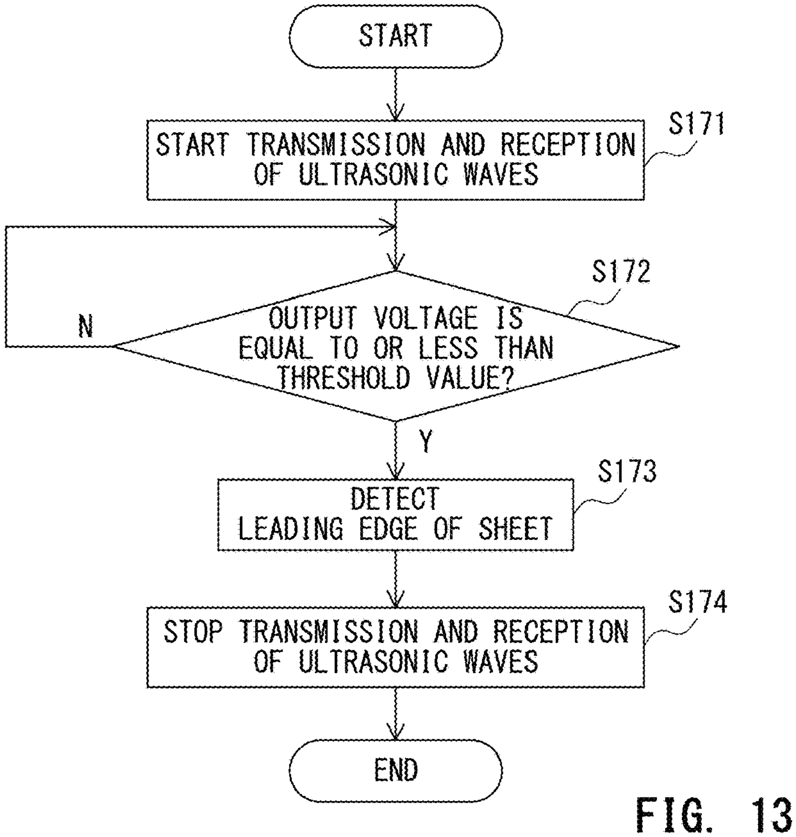
FIG. 13 is a processing flowchart for illustrating sheet detection processing of Step S114.

FIG. 13 is a processing flowchart for illustrating the sheet detection processing of Step S114. The detection of the sheet S is performed by detecting the leading edge of the sheet S. Here, a case in which the information processing unit 160 performs this processing is described, but the processing may be performed by the control unit 400.

The information processing unit 160 starts the transmission of ultrasonic waves by the ultrasonic wave transmitter 130 and starts the reception of the ultrasonic waves by the ultrasonic wave receiver 131 at a timing before the sheet S conveyed by the conveyance roller pair 280 reaches the measurement position of the ultrasonic wave sensor 120 (Step S171). For example, the information processing unit 160 starts the transmission of ultrasonic waves by the ultrasonic wave transmitter 130 and starts the reception of the ultrasonic waves by the ultrasonic wave receiver 131 based on the timing at which the initial adjustment processing of Step S113 (see FIG. 11) has ended. Transmission of the ultrasonic waves by the ultrasonic wave transmitter 130 and reception of the ultrasonic waves by the ultrasonic wave receiver 131 are performed at regular intervals.

The information processing unit 160 acquires the output voltage from the ultrasonic wave receiver 131, and repeatedly compares the acquired output voltage with a predetermined threshold value until the output voltage becomes equal to or less than the threshold value (Step S172: N). In a case where the output voltage becomes equal to or less than the threshold value (Step S172: Y), the information processing unit 160 determines that the leading edge of the sheet S has been detected (Step S173). In a case where the information processing unit 160 detects the leading edge of the sheet S, the information processing unit 160 stops the transmission of ultrasonic waves by the ultrasonic wave transmitter 130 and reception of the ultrasonic waves by the ultrasonic wave receiver 131 (Step S174). After that, the information processing unit 160 advances the process to Step S115 (see FIG. 11).

Figure 14:
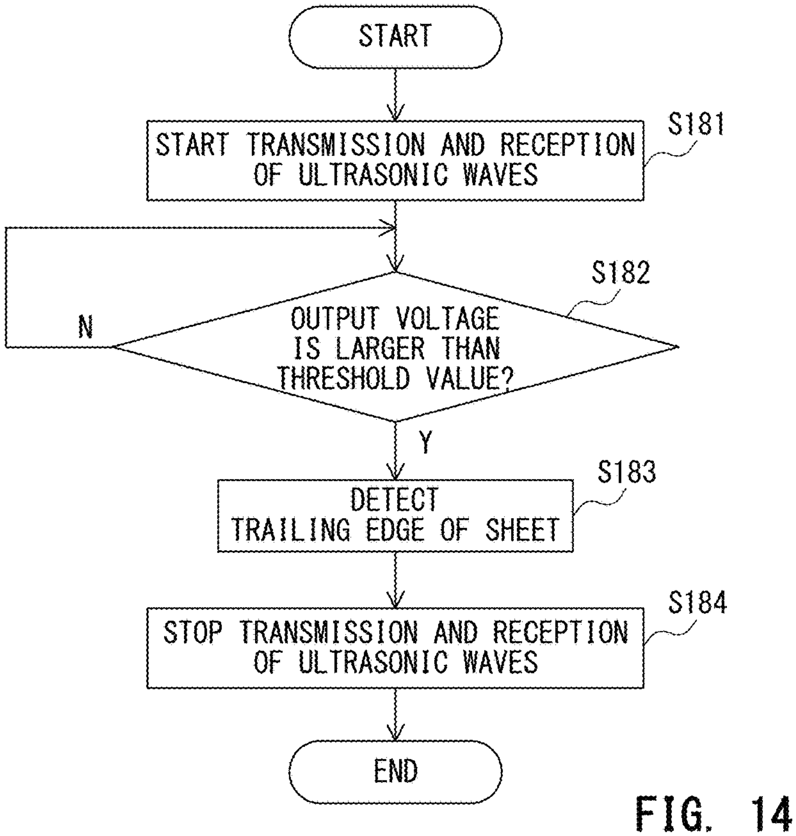
FIG. 14 is a processing flowchart for illustrating sheet passing detection processing of Step S117.

FIG. 14 is a processing flowchart for illustrating sheet passage detection processing of Step S117. The detection of passage of the sheet S is performed by detecting the trailing edge of the sheet S. The processing is performed, for example, after the feature amounts of the sheet S are measured in the processing step of Step S116 (see FIG. 11). Here, a case in which the information processing unit 160 performs the processing is described, but the processing may be performed by the control unit 400.

After the processing for measuring the feature amounts of the sheet S ends, the information processing unit 160 starts transmission of the ultrasonic waves by the ultrasonic wave transmitter 130, and starts reception of the ultrasonic waves by the ultrasonic wave receiver 131 (Step S181). The transmission of ultrasonic waves by the ultrasonic wave transmitter 130 and reception of the ultrasonic waves by the ultrasonic wave receiver 131 are performed at regular intervals. It is noted that due to the measurement of the feature amounts of the sheet S, the ultrasonic wave sensor 120 is already transmitting ultrasonic waves by the ultrasonic wave transmitter 130 and receiving the ultrasonic waves by the ultrasonic wave receiver 131. Therefore, following the processing step of Step S116, the information processing unit 160 may continue the transmission of ultrasonic wave by the ultrasonic wave transmitter 130 and reception of the ultrasonic waves by the ultrasonic wave receiver 131.

The information processing unit 160 acquires the output voltage from the ultrasonic wave receiver 131, and repeatedly compares the acquired output voltage with a predetermined threshold value until the output voltage becomes larger than the threshold value (Step S182: N). In a case where the output voltage becomes larger than the threshold value (Step S182: Y), the information processing unit 160 determines that the trailing edge of the sheet S has been detected (Step S183). In a case where the information processing unit 160 detects the trailing edge of the sheet S, the information processing unit 160 stops the transmission of ultrasonic waves by the ultrasonic wave transmitter 130 and reception of the ultrasonic waves by the ultrasonic wave receiver 131 (Step S184). After that, the information processing unit 160 advances the process to Step S118 (see FIG. 11).

As described above, the image forming apparatus 201 of the at least one embodiment determines image forming conditions by using, for example, the type and the basis weight of the sheet S determined based on the measurement results of the feature amounts of the sheet S obtained by the media sensor 100. Therefore, the image forming apparatus 201 can form an image on the sheet S based on optimal image forming conditions. In a case where the media sensor 100 measures the feature amounts of the sheet S, the media-sensor-facing roller 260 causes the sheet S to abut against the media sensor 100. As a result, the sheet S is measured in a stable posture. Thus, the media sensor 100 can accurately measure the feature amounts of the sheet S.

The media-sensor-facing roller 260 is controlled so as to move between the first position and the second position in response to detection of the sheet S by the media sensor 100. To detect sheet S by the media sensor 100, there is no longer a requirement to separately provide a sensor dedicated to detecting the position of the sheet S, as in the related art. Therefore, costs can be suppressed. Thus, the image forming apparatus 201 of the at least one embodiment can suppress a decrease in the detection accuracy of the sheet S, and can also suppress the occurrence of conveyance failure of the sheet.

In FIG. 13 and FIG. 14, an example in which the leading edge and the trailing edge of the sheet S are detected by the ultrasonic wave sensor 120 has been described, but the leading edge and the trailing edge of the sheet S may be detected by the optical sensor 150. For example, the optical sensor 150 emits light from the light source 1501 toward the conveyance path, and the line sensor 1502 receives the reflected light. The line sensor 1502 receives reflected light when the sheet S is present, and does not receive reflected light when the sheet S is absent. Based on the difference, the light receiver outputs different output values when the sheet S is present and when the sheet S is absent. The output value is compared with a predetermined threshold value, and the presence or absence of the sheet S can be determined based on the comparison result.

Further, the detection of the leading edge and the trailing edge of the sheet S is not limited to being performed by a reflection type sensor like the optical sensor 150, and the detection may also be performed by using a transmission type optical sensor. In this case, in the optical sensor, the light source and the light receiver are arranged facing each other across the conveyance path of the sheet S. The light emitted from the light source is not received by the light receiver when the sheet S is present, but is received by the light receiver when the sheet S is absent. Based on the difference, the light receiver outputs different output values when the sheet S is present and when the sheet S is absent. The output value is compared with a predetermined threshold value, and the presence or absence of the sheet S can be determined based on the comparison result.

The media sensor 100 described above is an example, and is not limited to a configuration including the optical sensor 150 and the ultrasonic wave sensor 120. The media sensor 100 may include another sensor which can measure a feature amount of the sheet S. Further, the media sensor 100 may include any one of the optical sensor 150 and the ultrasonic wave sensor 120. Moreover, in the configuration of the at least one embodiment, the media sensor 100 is included in the image forming apparatus 201, but the media sensor 100 may be arranged outside the image forming apparatus 201. For example, the media sensor 100 may detect the sheet S when the user manually inserts the sheet S into an insertion slot.

Further, in the above description, a configuration in which the print mode database 402 is included in the memory 401 of the controller 200 has been described, but the storage location of the print mode database 402 is not limited to this. For example, the print mode database 402 may be stored in the memory 1601 included in the media sensor 100. In this case, the information processing unit 160 determines the type and the basis weight of the sheet S, and the information processing unit 160 also determines the print mode.

In addition, the image forming apparatus 201 described above determines control parameters such as the image forming conditions by detecting, for example, the type and the basis weight of the sheet S from the feature amounts of the sheet S measured by the media sensor 100. However, the control parameters may be directly determined from the feature amounts. The media sensor 100 may be a device which measures the physical properties of another sheet.

Modification Example 1

Figure 15:
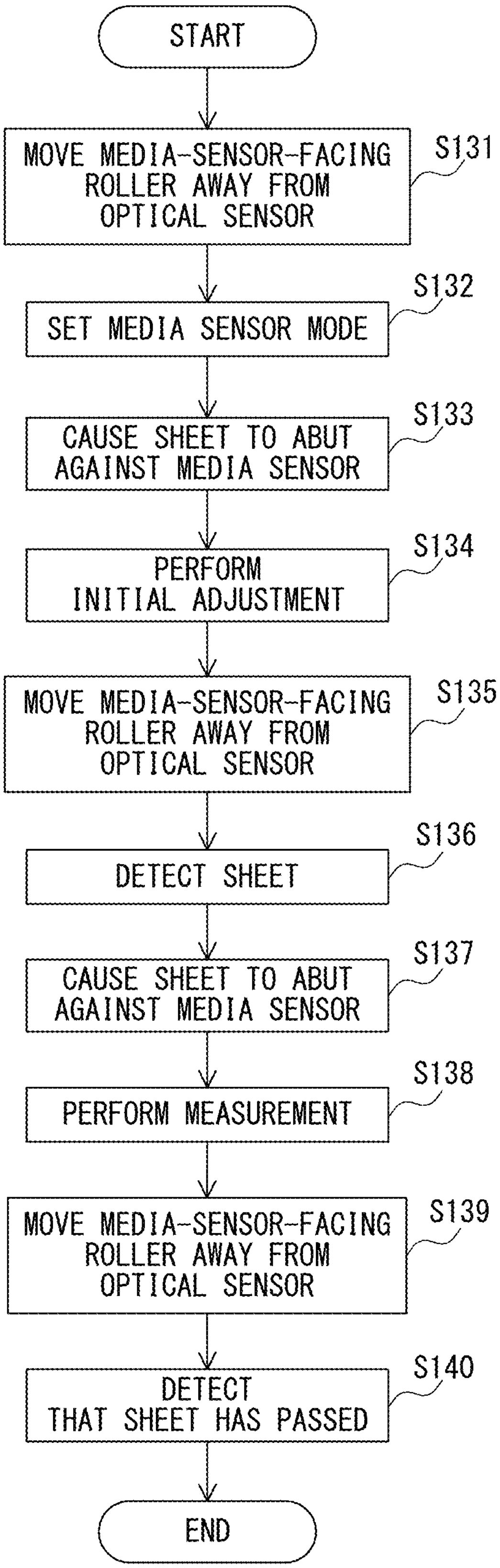
FIG. 15 is a processing flowchart for illustrating movement processing of the media-sensor-facing roller in Modification Example 1.

The sheet can be conveyed smoothly by shortening the time for which the media-sensor-facing roller 260 is in abutment against the media sensor 100 after measurement of the sheet S. FIG. 15 is a processing flowchart for illustrating movement processing of the media-sensor-facing roller 260 in Modification Example 1. It is noted that in a case where the movement of the media-sensor-facing roller 260 is controlled, the sheet pressing roller 261 is also controlled to move in the same way. Here, a case in which the control unit 400 performs this processing is described, but the processing may be executed by the information processing unit 160 under the control of the control unit 400.

Similar to the processing steps of Step S111 and Step S112 of FIG. 11, the control unit 400 moves the media-sensor-facing roller 260 away from the optical sensor 150, and confirms that the media sensor mode is set (Step S131, Step S132). Similar to the processing step of Step S113 of FIG. 11, the control unit 400 moves the media-sensor-facing roller 260 to the second position, performs initial adjustment such as calibration, and then moves the media-sensor-facing roller 260 to the first position (Step S133 to Step S135).

Figure 16:
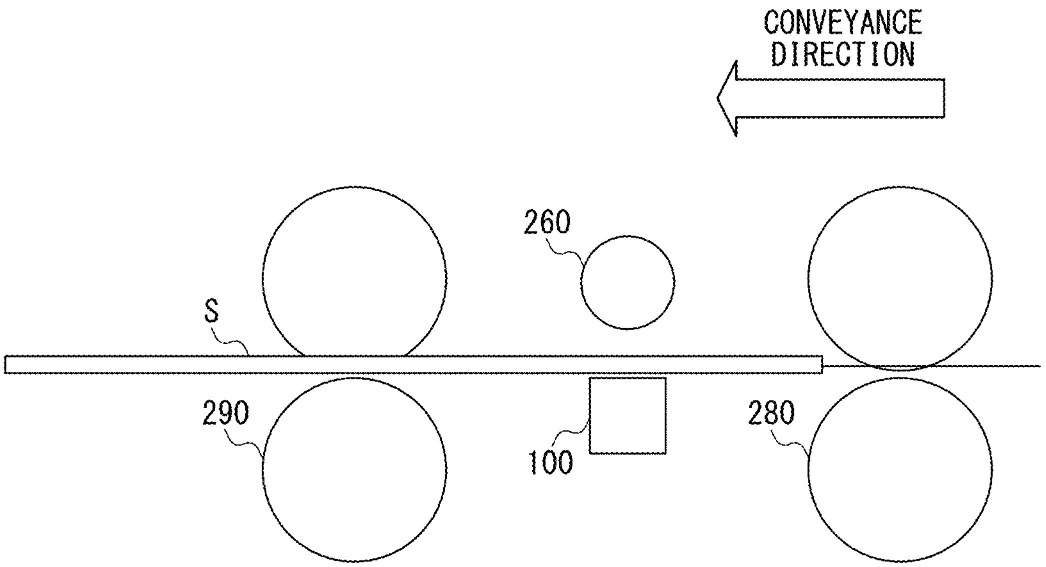
FIG. 16 is a diagram for illustrating a state in which the media-sensor-facing roller has moved to a first position.

Similar to the processing steps of from Step S114 to Step S116 of FIG. 11, the control unit 400 detects the sheet S by using the media sensor 100, stops conveyance of the sheet S, moves the media-sensor-facing roller 260 to the second position, and performs measurement processing by using the media sensor 100 (Step S136 to Step S138). The control unit 400 stops the media sensor 100 in a case where the measurement of the feature amounts of the sheet S ends. Then, the control unit 400 rotatably drives the motor 300 to move the media-sensor-facing roller 260 to the first position (Step S139). This causes the media-sensor-facing roller 260 to move away from the optical sensor 150. FIG. 16 is a diagram for illustrating a state in which the media-sensor-facing roller 260 has moved to the first position. In FIG. 16, the media-sensor-facing roller 260 has moved to the first position before the sheet S passes the measurement position of the media sensor 100.

After that, the control unit 400 detects that the sheet S has passed the measurement position of the media sensor 100 (Step S140). The control unit 400 detects that the sheet S has passed the measurement position of the media sensor 100 when the media sensor 100 detects the trailing edge of the sheet S. Other than when the feature amounts of the sheet S are measured, the media-sensor-facing roller 260 is constantly on standby at the first position so as not to hinder the conveyance of the sheet S.

In Modification Example 1, the media-sensor-facing roller 260 moves away from the media sensor 100 before the sheet S passes the measurement position of the media sensor 100. Therefore, the length of time for which the media-sensor-facing roller 260 is in abutment against the sheet S is shorter than in the case of the processing of FIG. 11. As a result, the load on sheet conveyance due to the media-sensor-facing roller 260 being brought into abutment against the sheet S is reduced, and the sheet S is conveyed smoothly.

Modification Example 2

Figure 17:
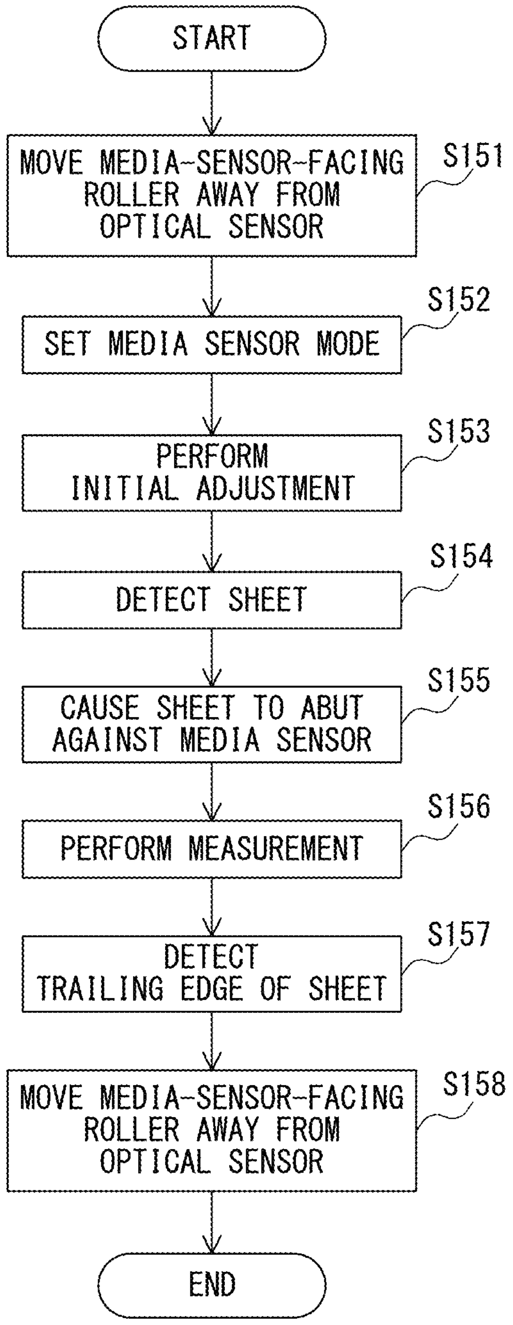
FIG. 17 is a processing flowchart for illustrating movement processing of the media-sensor-facing roller in Modification Example 2.

The durability of the moving mechanism 700 can be improved by minimizing the number of times the media-sensor-facing roller 260 is moved. FIG. 17 is a processing flowchart for illustrating movement processing of the media-sensor-facing roller 260 in Modification Example 2. It is noted that in a case where the movement of the media-sensor-facing roller 260 is controlled, the sheet pressing roller 261 is also controlled to move in the same way. Here, a case in which the control unit 400 performs this processing is described, but the processing may be executed by the information processing unit 160 under the control of the control unit 400.

Similar to the processing steps of Step S111 and Step S112 of FIG. 11, the control unit 400 moves the media-sensor-facing roller 260 away from the optical sensor 150, and confirms that the media sensor mode is set (Step S151, Step S152). The control unit 400 performs initial adjustment processing for the media sensor 100 while maintaining a state in which the media-sensor-facing roller 260 is separated from the media sensor 100 (Step S153). In the initial adjustment processing, the media sensor 100 is activated and measurement is performed by the ultrasonic wave sensor

120 under a state in which a sheet is absent. After that, the light amount of the optical sensor 150 is adjusted. Unlike the processing of FIG. 11, in this initial adjustment processing, the media-sensor-facing roller 260 does not move from the first position.

In a case where the initial adjustment ends, the control unit 400 is on standby until the control unit 400 acquires an instruction to start a print job. In a case where the control unit 400 acquires an instruction to start a print job, the control unit 400 starts conveyance of the sheet S by the conveyance unit 600. In a case where the media sensor 100 detects the sheet S after the conveyance of the sheet S has started, the control unit 400 stops the conveyance of the sheet S by the conveyance unit 600 (Step S154). The media-sensor-facing roller 260 maintains a state separated from the media sensor 100 after the processing step of Step S151.

Similar to the processing steps of Step S115 and Step S116 of FIG. 11, the control unit 400 moves the media-sensor-facing roller 260 to the second position, and measures the feature amounts of the sheet S by using the media sensor 100 (Step S155, Step S156). In a case where the measurement ends, similar to the processing steps of Step S117 and Step S118 of FIG. 11, the control unit 400 detects that the sheet S has passed the measurement position of the media sensor 100, and moves the media-sensor-facing roller 260 to the first position (Step S157, Step 158).

The media-sensor-facing roller 260 is constantly at the first position and separated from the media sensor 100 other than when the sheet S is measured. Therefore, the media-sensor-facing roller 260 does not hinder the conveyance of the sheet S. Thus, initial adjustment processing may be performed on the media sensor 100 under a state in which the media-sensor-facing roller 260 is separated from the media sensor 100. As a result, the state in which the media-sensor-facing roller 260 abuts against the media sensor 100 can be shortened. The movement control of the media-sensor-facing roller 260 is simplified, and thus the durability of the moving mechanism 700 is improved.

Modification Example 3

Figure 18:
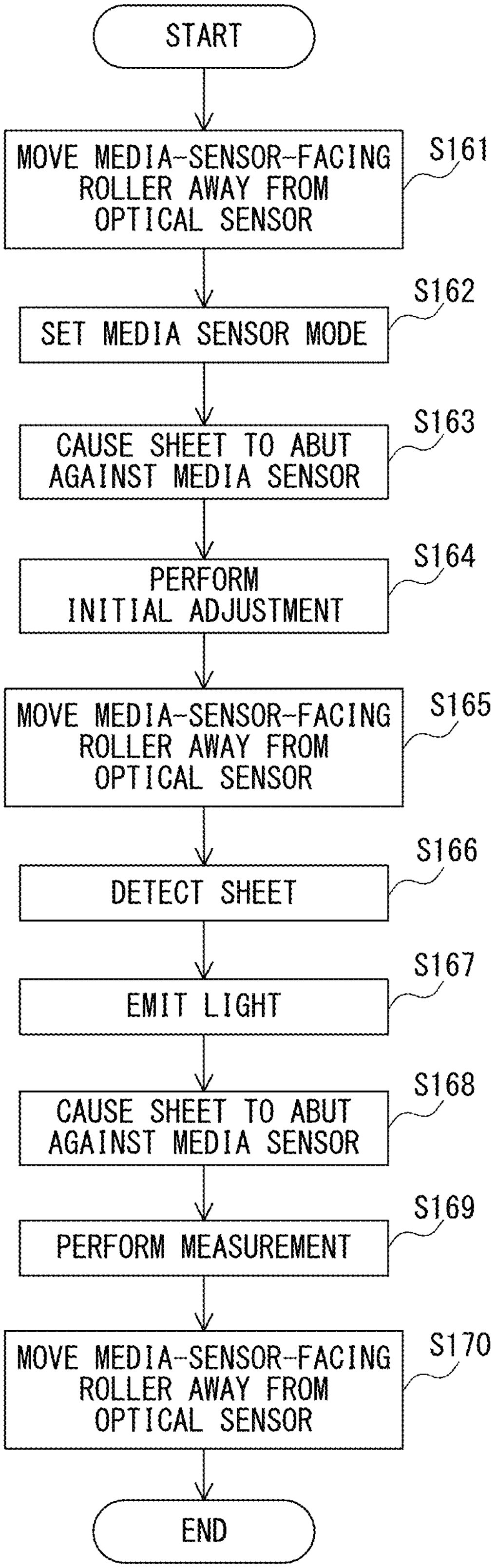
FIG. 18 is a processing flowchart for illustrating movement processing of the media-sensor-facing roller in Modification Example 3.

The light source 1501 of the optical sensor 150 may emit light at a timing that does not affect the movement of the media-sensor-facing roller 260. FIG. 18 is a processing flowchart for illustrating another example of movement processing of the media-sensor-facing roller 260 in Modification Example 3. It is noted that in a case where the movement of the media-sensor-facing roller 260 is controlled, the sheet pressing roller 261 is also controlled to move in the same way. Here, a case in which the control unit 400 performs this processing is described, but the processing may be executed by the information processing unit 160 under the control of the control unit 400.

Similar to the processing steps of Step S111 and Step S112 of FIG. 11, the control unit 400 moves the media-sensor-facing roller 260 away from the optical sensor 150, and confirms that the media sensor mode is set (Step S161, Step S162). Similar to the processing step of Step S113 of FIG. 11, the control unit 400 moves the media-sensor-facing roller 260 to the second position, performs initial adjustment such as calibration, and then moves the media-sensor-facing roller 260 to the first position (Step S163 to Step S165).

Similar to the processing step of Step S114 of FIG. 11, the control unit 400 detects the sheet S by using the media sensor 100, and stops conveyance of the sheet S (Step S166). The control unit 400 causes the information processing unit 160 to cause the light source 1501 included in the optical sensor 150 of the media sensor 100 to emit light (Step S167). The control unit 400 rotatably drives the motor 300 to move the media-sensor-facing roller 260 to the second position (Step S168). As a result, the media-sensor-facing roller 260 abuts against the media sensor 100. Based on such control, the media-sensor-facing roller 260 can stabilize the posture of the sheet S during measurement by pressing the sheet S against the media sensor 100 without hindering the conveyance of the sheet S to the measurement position of the media sensor 100.

After that, similar to the processing steps of Step S138 and Step S139 of FIG. 11, the control unit 400 measures the feature amounts of the sheet S by using the media sensor 100, and then moves the media-sensor-facing roller 260 away from the media sensor 100 (Step S169, Step S170). Other than when the feature amounts of the sheet S are measured, the media-sensor-facing roller 260 is constantly on standby at the first position so as not to hinder the conveyance of the sheet S. The light source 1501 of the optical sensor 150 emits light at a timing that does not affect the movement of the media-sensor-facing roller 260. In this processing, the light source 1501 emits light after the leading edge of the sheet S is detected and before the media-sensor-facing roller 260 abuts against the media sensor 100. Therefore, the optical sensor 150 can immediately measure the sheet S with a stable amount of light.

Description of the operation of the media-sensor-facing roller 260 with respect to the optical sensor 150 has been given above. The media-sensor-facing roller 260 is arranged so as to sandwich the ultrasonic wave sensor 120 between the media-sensor-facing roller 260 and the sheet pressing roller 261 (see FIG. 5). With this configuration, in a case where the sheet S reaches the measurement position of the media sensor 100, the media-sensor-facing roller 260 and the sheet pressing roller 261 press the sheet S against the measurement position of the ultrasonic wave sensor 120. The ultrasonic wave sensor 120 transmits ultrasonic waves through the sheet S and measures feature amounts. The state of the sheet S is stabilized by the media-sensor-facing roller 260 and the sheet pressing roller 261, and thus the feature amounts of the sheet S can be accurately measured by the ultrasonic wave sensor 120.

Figure 19:
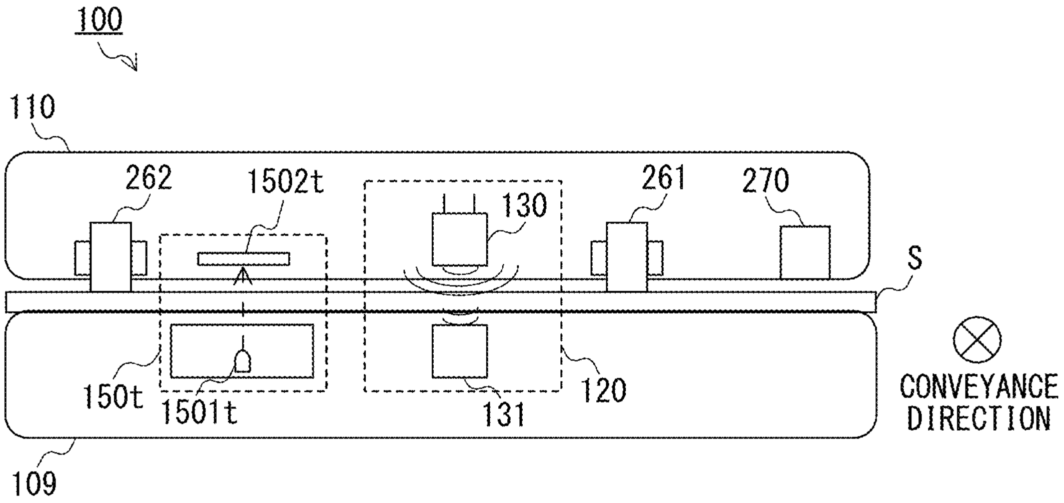
FIG. 19 is an explanatory view of a configuration of a media sensor.

Similarly, the media-sensor-facing roller 260 and the sheet pressing roller 261 are effective in a case where a transmission optical sensor is used. FIG. 19 is an explanatory view of a configuration of a media sensor which uses a transmission optical sensor 150*t*. The transmission optical sensor 150*t* transmits light through the sheet S and measures feature amounts. For that purpose, a light source 1501*t* and a line sensor 1502*t* are arranged facing each other across the conveyance path. Further, the media-sensor-facing roller 260 is not included, and a sheet pressing roller 262 is arranged facing the sheet pressing roller 261 so as to sandwich the optical sensor 150*t*. The state of the sheet S is stabilized by the sheet pressing roller 261 and the sheet pressing roller 262, and thus the feature amounts of the sheet S can be accurately measured by the transmission optical sensor 150*t* as well. In other words, the state of the sheet S is stabilized by, in addition to the media-sensor-facing roller 260 directly pressing the sheet S against the optical sensor 150*t*, the two rollers pressing the sheet S against the optical sensor 150*t* as well. As a result, the sheet S can be stably measured even by the transmission optical sensor 150*t*, a reduction in the detection accuracy of the sheet can be suppressed, and the occurrence of conveyance failure of the sheet can also be suppressed.

The media sensor 100 described above is an example, and is not limited to a configuration including the optical sensor 150*t* and the ultrasonic wave sensor 120. The media sensor 100 may include another sensor which can measure a feature amount of the sheet S. Further, the media sensor 100 may include any one of the optical sensor 150*t* and the ultrasonic wave sensor 120.

Further, in the above description, a configuration in which the print mode database 402 is included in the memory 401 of the controller 200 has been described, but the storage location of the print mode database 402 is not limited to this. For example, the print mode database 402 may be stored in the memory 1601 included in the media sensor 100. In this case, the information processing unit 160 determines the type and the basis weight of the sheet S, and the information processing unit 160 also determines the print mode.

In the above description, the configuration of the image forming apparatus 201 has been described, but the present disclosure may be applied to any apparatus including a sheet detection device including the media sensor 100, the controller 200, the conveyance unit 600, the media-sensor-facing roller 260, and the sheet pressing roller 261. For example, such a sheet detection device may be used in an image reading device which reads an image printed on a sheet while conveying the sheet. The image reading device includes an auto document feeder (ADF). Through incorporating the sheet detection device in the ADF, it becomes possible to stably read an image and convey the sheet. Further, although detection of the leading edge and the trailing edge of the sheet is required as a trigger for the movement of the media-sensor-facing roller 260, it is not required to arrange a dedicated sensor for sheet detection, and thus costs can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-149048, filed Sep. 14, 2023, which is hereby incorporated by reference herein in its entirety.

What is claimed is:

1. A sheet detection device comprising:

a measurement unit for measuring a feature amount of a sheet conveyed by a conveyance unit;

a pressing member movable between a first position separated from the measurement unit and a second position closer to the measurement unit than the first position; and a moving unit configured to move the pressing member, wherein the pressing member is arranged by the moving unit at the first position in a case where the measurement unit detects that the sheet has not been conveyed to a measurement position of the measurement unit, wherein the moving unit is configured to move the pressing member from the first position to the second position in a case where the measurement unit detects that the sheet has been conveyed to the measurement position of the measurement unit, wherein the measurement unit is configured to measure the feature amount of the sheet under a state in which the pressing member is arranged at the second position, wherein the pressing member is arranged at the first position by the moving unit in a case where an initial adjustment of the measurement unit is executed under a state in which the sheet has not been conveyed to the measurement position of the measurement unit, and wherein the measurement unit is configured to execute the initial adjustment under a state in which the pressing member is arranged at the first position.

2. The sheet detection device according to claim 1, wherein the moving unit is configured to move the pressing member from the second position to the first position in a case where the measurement unit detects that the sheet has passed the measurement position of the measurement unit.

3. The sheet detection device according to claim 1, wherein the pressing member is arranged at the first position by the moving unit in a case where the sheet has not been conveyed to the measurement position of the measurement unit by the conveyance unit, wherein the moving unit is configured to move the pressing member from the first position to the second position in a case where the sheet has been conveyed to the measurement position of the measurement unit by the conveyance unit, and wherein the moving unit is configured to move the pressing member from the second position to the first position before the sheet passes the measurement position of the measurement unit.

4. The sheet detection device according to claim 1, wherein the moving unit is configured to:

move, in another case where the initial adjustment of the measurement unit is executed, the pressing member from the first position to the second position to control the pressing member to abut against the measurement unit; and move, in a case where the initial adjustment ends, the pressing member from the second position to the first position.

5. The sheet detection device according to claim 1, wherein the moving unit is configured to move, after the initial adjustment is executed, the pressing member from the first position to the second position in a case where the sheet has been conveyed to the measurement position of the measurement unit by the conveyance unit, and wherein the measurement unit is configured to measure the feature amount of the sheet under a state in which the pressing member is arranged at the second position.

6. The sheet detection device according to claim 1, wherein the measurement unit is configured to determine presence or absence of the sheet based on a result of comparison between an output voltage representing a result of detection of the sheet by the measurement unit and a predetermined threshold voltage.

7. The sheet detection device according to claim 1, wherein the measurement unit comprises an ultrasonic wave sensor, and wherein the ultrasonic wave sensor is configured to determine presence or absence of the sheet by transmitting and receiving ultrasonic waves via a conveyance path of the sheet.

8. The sheet detection device according to claim 7, wherein the ultrasonic wave sensor comprises an ultrasonic wave transmitter configured to transmit ultrasonic waves toward the conveyance path and an ultrasonic wave receiver configured to receive the ultrasonic waves transmitted from the ultrasonic wave transmitter, wherein the ultrasonic wave receiver is configured to output an output voltage corresponding to an amplitude of the received ultrasonic waves, and wherein the measurement unit is configured to determine presence or absence of the sheet based on a result of comparison between the output voltage output from the ultrasonic wave receiver and a predetermined threshold voltage.

9. The sheet detection device according to claim 1, wherein the measurement unit comprises an optical sensor, and wherein the optical sensor is configured to determine presence or absence of the sheet based on reflected light of light emitted toward a conveyance path of the sheet.

10. The sheet detection device according to claim 9, wherein the optical sensor comprises a light source configured to emit light toward the conveyance path and a light receiver configured to receive the light emitted from the light source, wherein the light receiver is configured to output an output value corresponding to an amount of light received by the light receiver, and wherein the measurement unit is configured to determine the presence or absence of the sheet based on a result of comparison between the output value output from the light receiver and a predetermined threshold voltage.

11. The sheet detection device according to claim 1, wherein the pressing member is a rotating member.

12. An image forming apparatus comprising:

a sheet detection device; and an image forming unit configured to form an image on a sheet by using an image forming condition based on a feature amount of the sheet measured by a measurement unit, wherein the sheet detection device comprises:

a measurement unit for measuring a feature amount of a sheet conveyed by a conveyance unit;

a pressing member movable between a first position separated from the measurement unit and a second position closer to the measurement unit than the first position; and a moving unit configured to move the pressing member, wherein the pressing member is arranged by the moving unit at the first position in a case where the measurement unit detects that the sheet has not been conveyed to a measurement position of the measurement unit, wherein the moving unit is configured to move the pressing member from the first position to the second position in a case where the measurement unit detects that the sheet has been conveyed to the measurement position of the measurement unit, wherein the measurement unit is configured to measure the feature amount of the sheet under a state in which the pressing member is arranged at the second position, wherein the pressing member is arranged at the first position by the moving unit in a case where an initial adjustment of the measurement unit is executed under a state in which the sheet has not been conveyed to the measurement position of the measurement unit, and wherein the measurement unit is configured to execute the initial adjustment under a state in which the pressing member is arranged at the first position.

* * * * *